US012567061B1

(12) United States Patent
Burnette et al.

(10) Patent No.: US 12,567,061 B1
(45) Date of Patent: Mar. 3, 2026

(54) VIRTUAL ASSET ACCESS CARDS

(71) Applicant: SANCTUARY DEX CORP PTE. LTD., Houston, TX (US)

(72) Inventors: Blake C. Burnette, Magnolia, TX (US); Trien Bang Lam, Houston, TX (US); William Scott Thompson, Houston, TX (US)

(73) Assignee: SANCTUARY DEX CORP PTE. LTD., Houston, TX (US)

( * ) Notice: Subject to any disclaimer, the term of this patent is extended or adjusted under 35 U.S.C. 154(b) by 502 days.

(21) Appl. No.: 17/871,409

(22) Filed: Jul. 22, 2022

Related U.S. Application Data

(60) Provisional application No. 63/304,790, filed on Jan. 31, 2022, provisional application No. 63/225,380, filed on Jul. 23, 2021.

(51) Int. Cl.
*G06Q 20/38* (2012.01)
*H04L 9/00* (2022.01)
*G06Q 20/06* (2012.01)

(52) U.S. Cl.
CPC .......... *G06Q 20/3829* (2013.01); *H04L 9/50* (2022.05); *G06Q 20/065* (2013.01)

(58) Field of Classification Search
None
See application file for complete search history.

(56) References Cited

U.S. PATENT DOCUMENTS

| | | | |
|---|---|---|---|
| 7,607,574 B2 * | 10/2009 | Kingsborough et al. | |
| 11,093,910 B2 * | 8/2021 | Sobotka | |
| 2012/0037708 A1 * | 2/2012 | Irwin, Jr. | |
| 2013/0166455 A1 * | 6/2013 | Feigelson | |

OTHER PUBLICATIONS

Shayan Eskandari, A First Look at the Usability of Bitcoin Key Management, Jan. 2015 (Year: 2015).*

* cited by examiner

*Primary Examiner* — Neha Patel
*Assistant Examiner* — Yin Y Choi
(74) *Attorney, Agent, or Firm* — E. Randall Smith; E. Randall Smith, P.C.

(57) ABSTRACT

Virtual asset access cards are provided. Certain embodiments involve first and second separable portions, the first portion being associated with a public key that corresponds with a virtual asset wallet and the second portion being associated with a private key that corresponds with the public key. Various embodiments involve a card having a first machine-readable code associated with a public key that corresponds with a virtual asset wallet, a second machine-readable code associated with a private key that corresponds with the public key and at least one concealer configured to provide selective access to the second machine-readable code.

20 Claims, 18 Drawing Sheets

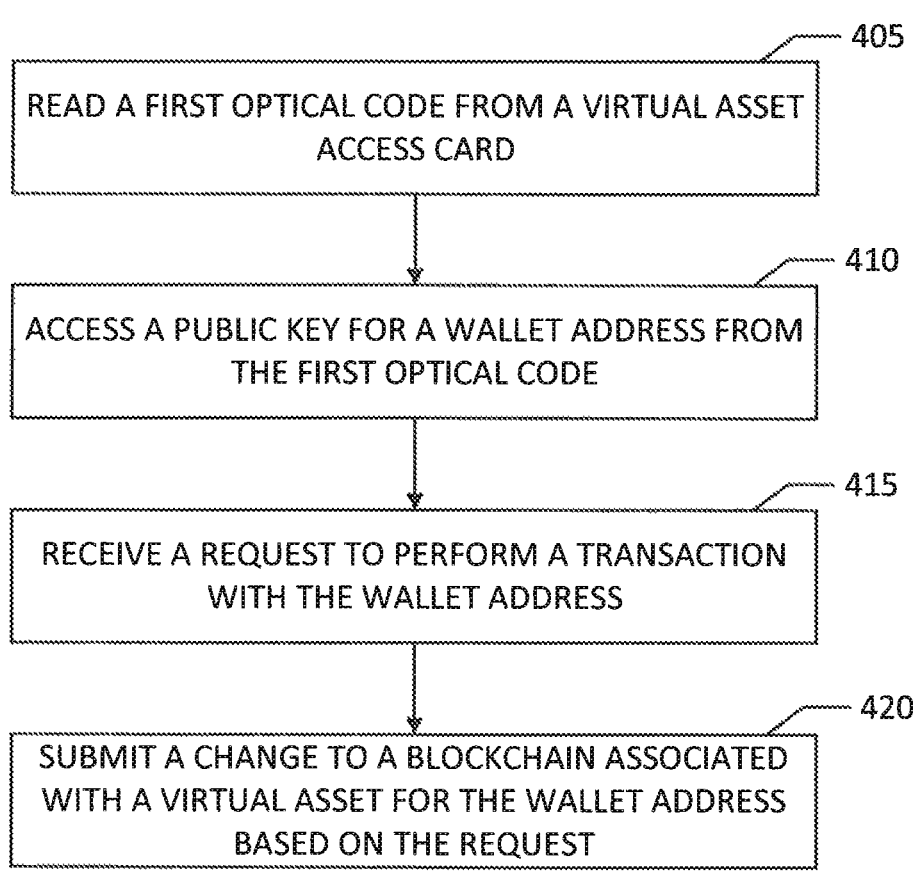
400
405
READ A FIRST OPTICAL CODE FROM A VIRTUAL ASSET ACCESS CARD
410
ACCESS A PUBLIC KEY FOR A WALLET ADDRESS FROM THE FIRST OPTICAL CODE
415
RECEIVE A REQUEST TO PERFORM A TRANSACTION WITH THE WALLET ADDRESS
420
SUBMIT A CHANGE TO A BLOCKCHAIN ASSOCIATED WITH A VIRTUAL ASSET FOR THE WALLET ADDRESS BASED ON THE REQUEST
*FIG. 4*

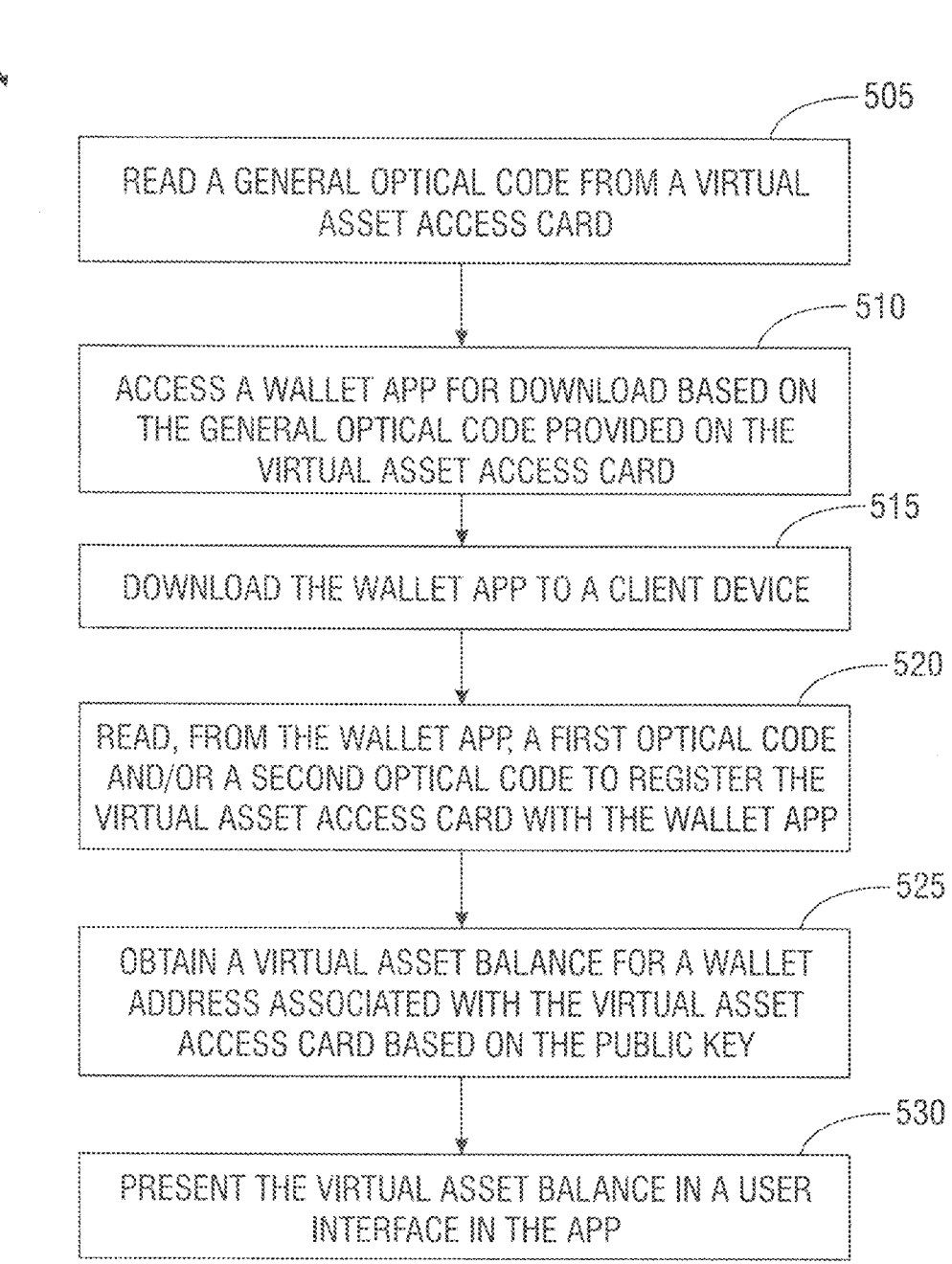

500

505

READ A GENERAL OPTICAL CODE FROM A VIRTUAL ASSET ACCESS CARD

510

ACCESS A WALLET APP FOR DOWNLOAD BASED ON THE GENERAL OPTICAL CODE PROVIDED ON THE VIRTUAL ASSET ACCESS CARD

515

DOWNLOAD THE WALLET APP TO A CLIENT DEVICE

520

READ, FROM THE WALLET APP, A FIRST OPTICAL CODE AND/OR A SECOND OPTICAL CODE TO REGISTER THE VIRTUAL ASSET ACCESS CARD WITH THE WALLET APP

525

OBTAIN A VIRTUAL ASSET BALANCE FOR A WALLET ADDRESS ASSOCIATED WITH THE VIRTUAL ASSET ACCESS CARD BASED ON THE PUBLIC KEY

530

PRESENT THE VIRTUAL ASSET BALANCE IN A USER INTERFACE IN THE APP

*FIG. 5*

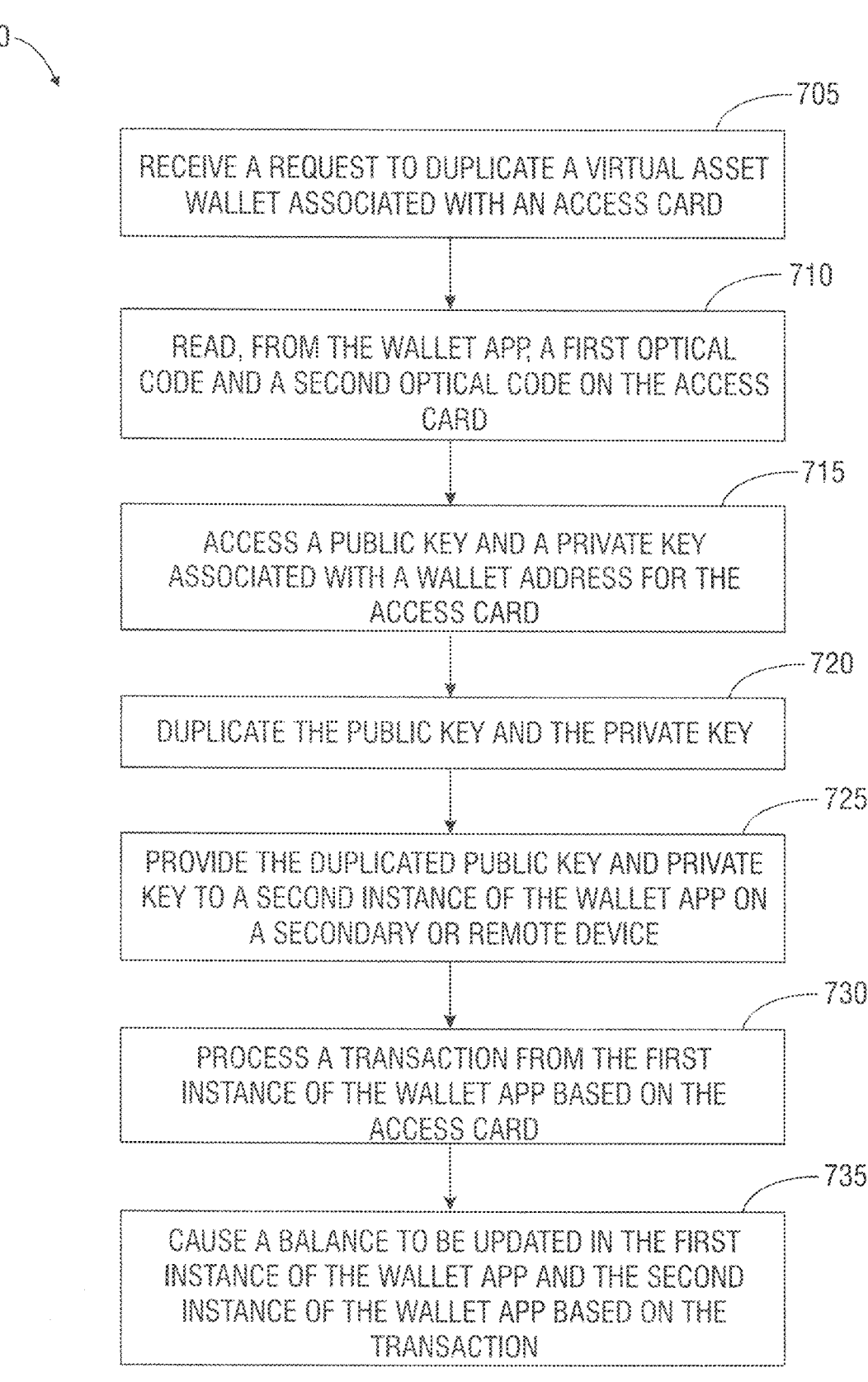

700

705

RECEIVE A REQUEST TO DUPLICATE A VIRTUAL ASSET
WALLET ASSOCIATED WITH AN ACCESS CARD

710

READ, FROM THE WALLET APP, A FIRST OPTICAL
CODE AND A SECOND OPTICAL CODE ON THE ACCESS
CARD

715

ACCESS A PUBLIC KEY AND A PRIVATE KEY
ASSOCIATED WITH A WALLET ADDRESS FOR THE
ACCESS CARD

720

DUPLICATE THE PUBLIC KEY AND THE PRIVATE KEY

725

PROVIDE THE DUPLICATED PUBLIC KEY AND PRIVATE
KEY TO A SECOND INSTANCE OF THE WALLET APP ON
A SECONDARY OR REMOTE DEVICE

730

PROCESS A TRANSACTION FROM THE FIRST
INSTANCE OF THE WALLET APP BASED ON THE
ACCESS CARD

735

CAUSE A BALANCE TO BE UPDATED IN THE FIRST
INSTANCE OF THE WALLET APP AND THE SECOND
INSTANCE OF THE WALLET APP BASED ON THE
TRANSACTION

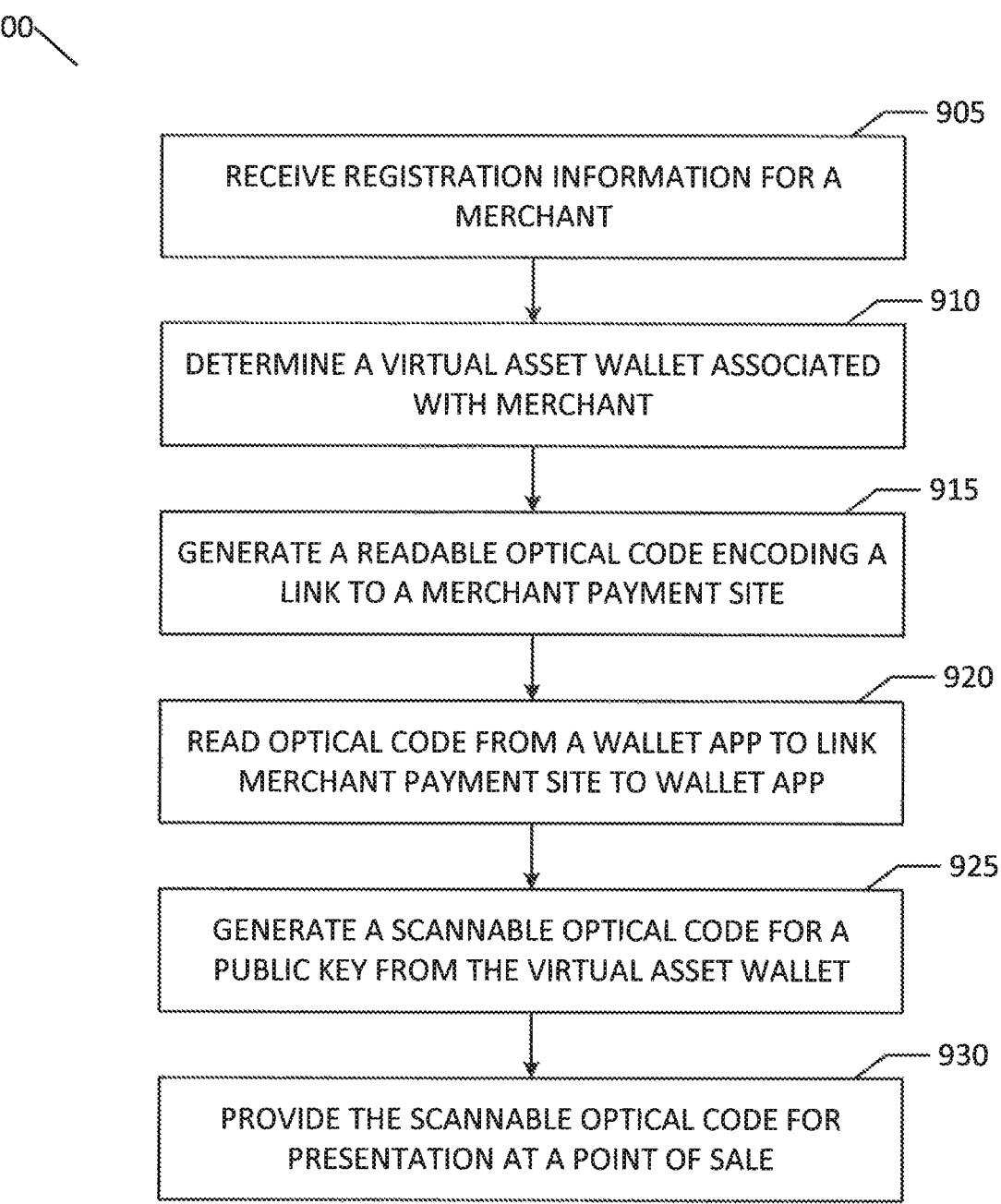

905

RECEIVE REGISTRATION INFORMATION FOR A MERCHANT

910

DETERMINE A VIRTUAL ASSET WALLET ASSOCIATED WITH MERCHANT

915

GENERATE A READABLE OPTICAL CODE ENCODING A LINK TO A MERCHANT PAYMENT SITE

920

READ OPTICAL CODE FROM A WALLET APP TO LINK MERCHANT PAYMENT SITE TO WALLET APP

925

GENERATE A SCANNABLE OPTICAL CODE FOR A PUBLIC KEY FROM THE VIRTUAL ASSET WALLET

930

PROVIDE THE SCANNABLE OPTICAL CODE FOR PRESENTATION AT A POINT OF SALE

*FIG. 9*

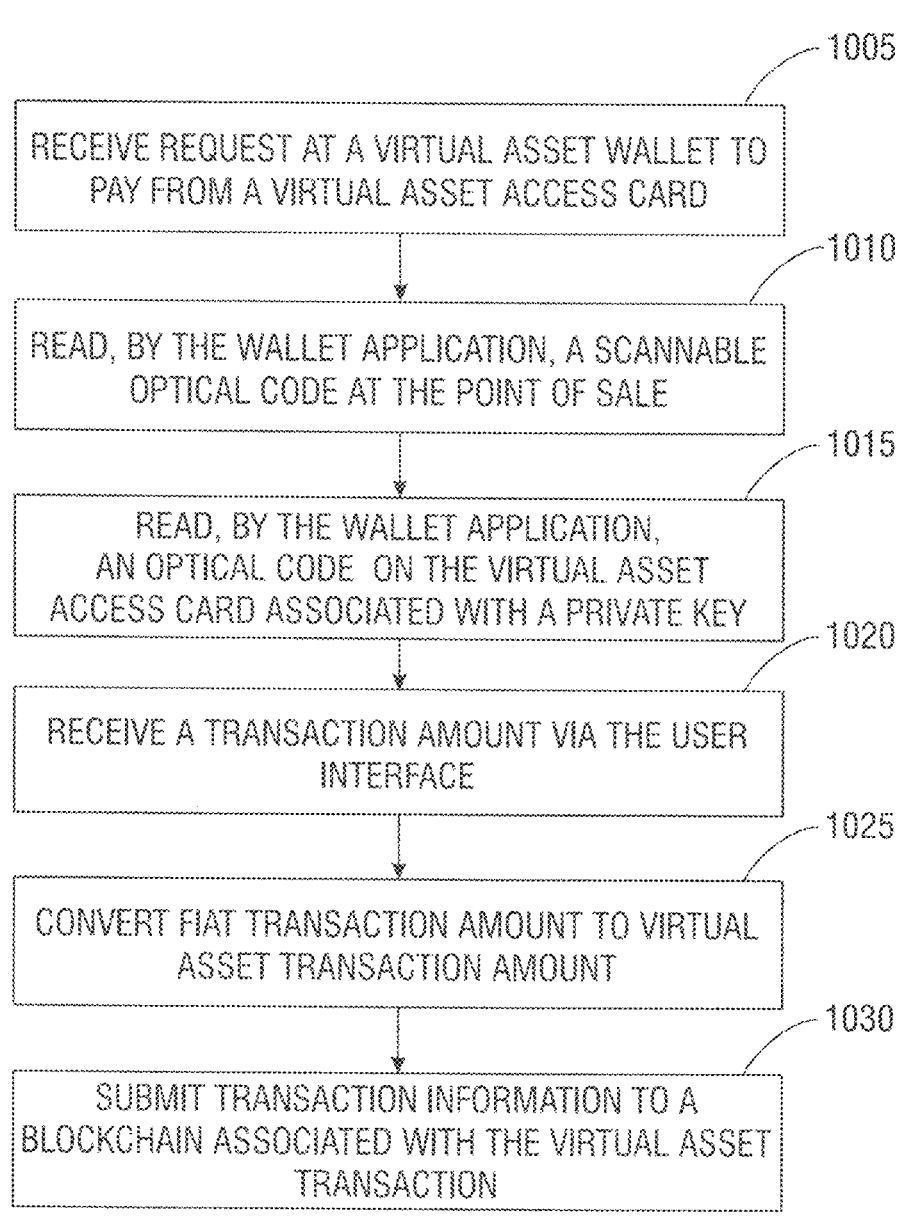

1005

RECEIVE REQUEST AT A VIRTUAL ASSET WALLET TO PAY FROM A VIRTUAL ASSET ACCESS CARD

1010

READ, BY THE WALLET APPLICATION, A SCANNABLE OPTICAL CODE AT THE POINT OF SALE

1015

READ, BY THE WALLET APPLICATION, AN OPTICAL CODE ON THE VIRTUAL ASSET ACCESS CARD ASSOCIATED WITH A PRIVATE KEY

1020

RECEIVE A TRANSACTION AMOUNT VIA THE USER INTERFACE

1025

CONVERT FIAT TRANSACTION AMOUNT TO VIRTUAL ASSET TRANSACTION AMOUNT

1030

SUBMIT TRANSACTION INFORMATION TO A BLOCKCHAIN ASSOCIATED WITH THE VIRTUAL ASSET TRANSACTION

Virtual Asset On Block Chain

Header:
ID : 3
ID of Previous Bill: 2
Date Found: YYYYY
Found By: ZZZZZZ
Sum Of Transactions: UUUU Ledger:
Fred DDDD:  .45
Shane Address MMMM : .30
Prepaid Card Address CCCCC: .25
Prepaid Card Address DDDDD: .25

108

PUBLIC KEY    PRIVATE

Instructions:        Optional Amount Of Coin

1100 Merchant Payment Sign

1105

PUBLIC KEY

102A

104A
Direct Payment
Feature

Wallet
Address

Blockchain Transaction
Submission Similar to

VIRTUAL ASSET ACCESS CARDS

CROSS REFERENCE TO RELATED APPLICATIONS

The present application claims priority to U.S. Provisional Patent Application Ser. No. 63/225,380, entitled "Systems, Apparatus and Methods Relating to Purchasing, Transferring & Managing Cryptocurrency and Related Activities" and filed on Jul. 23, 2021 and U.S. Provisional Patent Application Ser. No. 63/304,790, entitled "Systems, Apparatus & Methods Relating to Purchasing, Safeguarding, Storing, Transferring & Managing Cryptocurrency and Related Activities" and filed on Jan. 31, 2022, both of which are hereby incorporated by reference herein in their entireties.

FIELD OF THE DISCLOSURE

This patent relates generally to the field of virtual assets, such as cryptocurrency, and, in some embodiments, the management and transaction thereof.

BACKGROUND

Presently, cryptocurrencies and other virtual assets can circulate without the need for a central overseeing authority. The ownership of at least some virtual assets is currently managed on a blockchain, which is essentially an incorruptible digital ledger of (e.g. economic) transactions. The digital ledger can be stored in the form of one or more databases spread out across a multitude of computing devices, or nodes, in the network. The blockchain is said to be a trusted, decentralized network allowing for the transfer of digital value, such as digital currency and data and providing for fast, secure, and transparent peer-to-peer transactions.

Generally, in the present blockchain environment, to consummate a transaction of various types of virtual assets via a blockchain, certain data, such as, for example, public key (e.g. digital address) information of the recipient of the assets, private key information of the transferor, the amount of assets to be transferred, a time stamp etc., is submitted to the blockchain. This is typically done by the transferor (software, device, etc.). If the request is accepted, the blockchain ledger is essentially changed (e.g. with the submitted information) to reflect the new owner of the assets transferred.

Currently, there are limitations the use of cryptocurrency and other virtual assets. For example, it is generally cumbersome and difficult for the general population to access, manage and transfer these assets, and for merchants to accept them. Consequently, virtual assets are not widely used or accepted by merchants. Improvements are thus needed to enhance the accessibility and ease of use of virtual assets by more users and merchants.

It should be understood that the above-described examples, disadvantages, limitations, capabilities, descriptions and applications are provided for illustrative purposes only and are not intended to limit the scope or subject matter of this patent or the appended claims in any way. Thus, none of the appended claims should be limited by the above discussion or construed to address, include or exclude each or any of the above-cited examples, disadvantages, limitations, capabilities, applications and descriptions merely because of the mention thereof herein.

BRIEF SUMMARY OF THE DISCLOSURE

The present disclosure includes embodiments directed to new apparatus, systems and methods for the purchase, use, transfer, management, safeguarding, investment or tracking of virtual assets and related activities, or a combination thereof.

Various embodiments of the present disclosure involve systems for improved user accessibility to cryptocurrency and/or other virtual assets, for example through a wallet app, a virtual asset access card, a merchant application or a combination thereof. The wallet app and/or virtual asset access card may, for example, include (e.g., have encoded therein, printed thereon, or the like) one or more readable graphic or device, such as machine-readable optical codes, from which one or more private keys and/or public keys (e.g. useful to facilitate the transfer of virtual assets on a blockchain) associated with a digital wallet may be accessed. The wallet application can be an end-user application which provides a user with access to virtual asset wallets for the purposes of checking balances, purchasing virtual assets, transacting with virtual assets, and the like. In some embodiments, the public and private keys for a virtual asset wallet can be read by the wallet app from the virtual asset access card, other device or location the wallet is associated with, in order to transact virtual assets to and from the wallet.

In some embodiments, the wallet app includes functionality to enable moving virtual assets between wallets (e.g. wallets controlled by one user to wallets of another user, or multiple wallets of the same user). Moreover, in various embodiments, the wallet app may include functionality to clone the virtual asset wallet, allowing the assets therein to be accessed from multiple devices or wallet apps and by multiple people without changing ownership of the assets or incurring any blockchain transaction fees.

In some embodiments, a merchant system is provided including a merchant app which can be used to assist merchants in accepting virtual assets from customers (e.g. for payment at a point-of-sale). If desired, the merchant app may be capable of providing a readable code which, when scanned, provides a user (e.g. customer) with access to a public key associated with a merchant virtual asset wallet such that the user can perform a transaction with the merchant without access to any private information about the merchant's wallet (e.g. virtual asset balance, private key).

Various embodiments are directed to a virtual asset access card. Similar as in the exemplary systems mentioned above, the card may include (e.g., have encoded therein, printed thereon, or the like) one or more graphics or devices, such as optical readable codes, from which one or more of a private key and a public key (and/or other information) associated with a digital wallet may be accessed. In some embodiments, the virtual asset access card may conceal, protect or safeguard certain information (e.g. the private key).

The present disclosure also include embodiments of the card configured to be decoupled such that a portion with the public key(s) can be handled, for example, by a person (e.g. tasked to receive virtual assets into the associated wallet address) not having access to the associated private key(s) (needed to remove virtual assets from the wallet address). The portion of the card having the private key(s) can be maintained in a secure location (e.g. safe) until it is needed to remove virtual assets from the associated wallet address(es). For example, the virtual asset access card may have a main body portion having the private key(s) and a detachable portion having the associated public key(s) for one or more wallets, or vice versa. In some embodiments, the virtual asset access card may include one or more connectors by which the different portions or components of the card are attached, can be detached and reconnected. The connectors may, for example, be specific to a particular card, so that either portion of the card cannot be coupled to any portion of another card and vice versa.

In various embodiments, the present disclosure involves a virtual asset access card having a main body portion including at least a first item of information associated with a public key that corresponds with a virtual asset wallet. A detachable portion includes at least a second item of information associated with a private key that corresponds with the public key. The detachable portion is releasably coupled to the main body portion. At least one unique connector is associated with the main body portion and the detachable portion. The unique connector is specific to the main body portion and the detachable portion and configured to allow the detachable portion to be separated from and thereafter re-coupled to the main body portion while not being connectable to any portions of any other virtual asset access cards.

The following features are optional. The second item of information may be at least temporarily concealed. The virtual asset access card may present the first and second items of information using at least one selected from a group consisting of RFID technology, smart label technology, magnetic stripe technology and QR code technology. The unique connector may include a unique arrangement of at least two mating features. At least a first mating feature may be associated with the main body portion and at least a second mating feature may be associated with the detachable portion. The unique connector may include at least a first unique non-linear mating edge associated with the main body portion and at least a corresponding second unique non-linear mating edge associated with the detachable portion. The first and second mating edges may be mateable with one another to interconnect the main body portion and the detachable portion and not mateable with any portions of any other virtual asset access cards.

The main body portion and detachable portion may be interconnectable and separable along at least one seam and the unique connector(s) may include at least one visible image extending across the seam. The visible image(s) may include at least one selected from a group consisting of at least one watermark, graphic, code and imprint. The unique connector(s) may include a unique arrangement of one or more pins and corresponding receivers.

In certain embodiments, a virtual asset access card includes a first portion providing access to a public key that corresponds with a virtual asset wallet and a second portion providing access to a private key that corresponds with the public key. The public key is configured to allow access to information about the virtual asset wallet and assist in associating virtual assets with the virtual asset wallet. The private key is configured to allow the ownership of virtual assets associated with the virtual asset wallet to be changed. The first and second portions are selectively releasably interconnectable only with one another and configured to be repeatedly selectively physically separated from one another and thereafter reconnected together while not being connectable to any portions of any other virtual asset access cards.

These features are optional. The first and second portions may be slidably engageable. The second portion may be insertable into and removable from the first portion, whereby when the second portion is inserted into the first portion, the private key is inaccessible. At least a first mating feature may be associated with the first portion and at least a second mating feature associated with the second portion. The first and second mating features may be mateable with one another to interconnect the first and second portions and not mateable with any portions of any other virtual asset access cards. At least one connector may be associated with the first and second portions and configured to allow the first and second portions to be disconnected from one another and thereafter reconnected together while not being connectable to any portions of any other virtual asset access cards. The virtual asset access card may be configured to fit within at least one selected from a group consisting of a wallet and a clothing pocket.

In many embodiment, the present disclosure involves a contactless virtual asset access card having at least first and second portions. The first portion includes a first machine-readable code associated with a public key that corresponds with a first virtual asset wallet. The first machine-readable code is visible and configured to be electronically scanned without physically contacting the virtual asset access card to allow access to information about the first virtual asset wallet and assist in associating virtual assets with the first virtual asset wallet. The second portion includes a second machine-readable code associated with a private key that corresponds with the public key. The second machine-readable code is selectively visible so that, when visible, the second machine-readable code is configured to be electronically scanned without physically contacting the virtual asset access card to allow the ownership of virtual assets associated with the first virtual asset wallet to be changed. At least one reusable concealer is associated with the second machine-readable code and configured to provide selective access to the second machine-readable code.

These features are optional. The first and second machine-readable codes may each include at least one selected from a group consisting of at least one QR code, bar code, magnetic stripe, smart label, data matrix, RFID tag and RFID label. The virtual asset access card may include a third machine-readable code configured to provide access to a wallet application host site. The first and second machine-readable codes may be configured to be read by one or more software applications provided in a non-transitory computer readable medium comprising computer readable code executable by one or more processors. The second machine-readable code may be configured to be read by the one or more software applications to generate a duplicate version of the public and private keys without interacting with a blockchain. The duplicate version of the public and private keys may be configured to be associated with a second virtual asset wallet and used to change the ownership of virtual assets associated with the first virtual asset wallet.

The reusable concealer may be a holder which provides the first machine-readable code. The second machine-readable code may be provided on an insert insertable into and removable from the holder, whereby when the insert is inserted into the holder, the second machine-readable code is inaccessible. The reusable concealer may be provided in a software application configured to allow access to the second machine-readable code upon the presentation of at least one selected from a group consisting of at least one password, bio-metric feature, access code and graphic.

In some embodiments, the present disclosure involves a non-transitory computer readable medium that includes computer readable code executable by one or more processors to read, by a first wallet application, a first machine-readable optical code from a first virtual asset access card. The first machine-readable optical code is generated based on a public key for a first user, the public key being associated with a first virtual asset wallet. A request to perform a transaction involving the first virtual asset wallet using the public key is received and a change to a blockchain based upon the transaction using a blockchain address associated with the first virtual asset wallet is submitted.

The first virtual asset access card may include a second machine readable optical code generated based on a private key associated with the public key of the first virtual asset wallet. The first virtual asset access card may have a main body portion that includes the second machine readable optical code, a removable portion that includes the first machine readable optical code and is releasably coupled to the main body portion. At least one coupler unique to the first virtual asset access card may be associated with the main body portion and removable portion so that the removable portion may be separated from and re-coupled to the main body portion.

The computer readable code, in order to receive the request to perform the transaction, may include computer readable code to transfer virtual assets to, or associate virtual assets with, the blockchain address associated with the first virtual asset wallet. The non-transitory computer readable medium may include computer readable code that, in response to reading the first machine-readable optical code from the first virtual asset access card, obtains a balance of the amount of virtual assets residing at a blockchain address associated with the first virtual asset access card and presents the balance in a user interface of the first wallet application. The virtual assets may be transferred or associated via a decentralized transaction.

The non-transitory computer readable medium may include computer readable code to read the second machine-readable optical code from the first virtual asset access card, generate a duplicate version of the private key and the public key of the first virtual asset wallet and generate a second virtual asset wallet to include the duplicate version of the private key and the public key. The second virtual asset wallet may be accessible from a second virtual asset access card and virtual assets accessible via the first virtual asset access card may be additionally accessible via the second virtual asset wallet, and/or a second wallet application, from the second virtual asset access card.

In many embodiments, a non-transitory computer readable medium comprising computer readable code executable by one or more processors transmits a request to connect a merchant payment website to a merchant virtual asset wallet. In response to the request, the merchant payment website is caused to access a public key associated with the merchant virtual asset wallet and generate a machine-readable optical code based on the public key. The machine-readable optical code includes an encoded version of the public key hashed with a password and is readable by a client device.

If desired, when read by the client device, the optical readable code may provide access by the client device to the public key and not provide access to virtual assets associated with the public key, a balance of virtual assets associated with the public key or any private key information associated with the public key. The client device may implement the transfer of virtual assets to, or association of virtual assets with, a blockchain address associated with the public key. Computer readable code may convert a fiat currency amount associated with one or more items to a virtual asset value, calculate a total virtual asset amount that includes the virtual asset value and any related transaction fees and present the total amount in a user interface. The encoded version of the public key may be encoded with SH256 encryption. The optical readable code based on the public key may be generated based on a virtual asset type associated with the public key. Computer readable code may submit a transfer request to a blockchain associated with the virtual asset (e.g. cryptocurrency) type.

The present disclosure also includes embodiments of a virtual asset access card that includes a main body portion having at least a first item of information associated with a private key and a detachable portion that includes at least a second item of information associated with a public key corresponding to the private key and which is releasably coupled to the main body portion. One or more unique couplers specific to the particular virtual asset access card are associated with the main body portion and removable portion, so that the removable portion may be separated from re-coupled to the main body portion.

If desired, the virtual asset access card may be associated with a virtual asset wallet that includes the public key and the private key. The card may present the first item of information and/or the second item of information using nearfield RFID technology and/or QR code technology. The second item of information may be concealed, for example, by at least one among a non-permanent, semi-permanent material and a permanent material.

Accordingly, the present disclosure includes features and advantages which are believed to enable it to advance virtual asset technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 4 shows a flowchart of a technique for using a virtual asset access card to implement a change to a blockchain, according to one or more embodiments;

FIG. 5 shows a flowchart of a technique for using a virtual asset access card in association with a wallet app, according to one or more embodiments;

FIG. 7 depicts a flowchart of a technique for cloning a virtual asset wallet associated with a virtual asset access card, according to one or more embodiments;

FIG. 9 depicts a flowchart of a technique for registering a virtual wallet application with a merchant system in accordance with one or more embodiments;

FIG. 10 shows a flowchart of a technique for utilizing a virtual asset wallet at a merchant point-of-sale in accordance with one or more embodiments;

DETAILED DESCRIPTION OF PRESENTLY PREFERRED EMBODIMENTS

Figure 1:
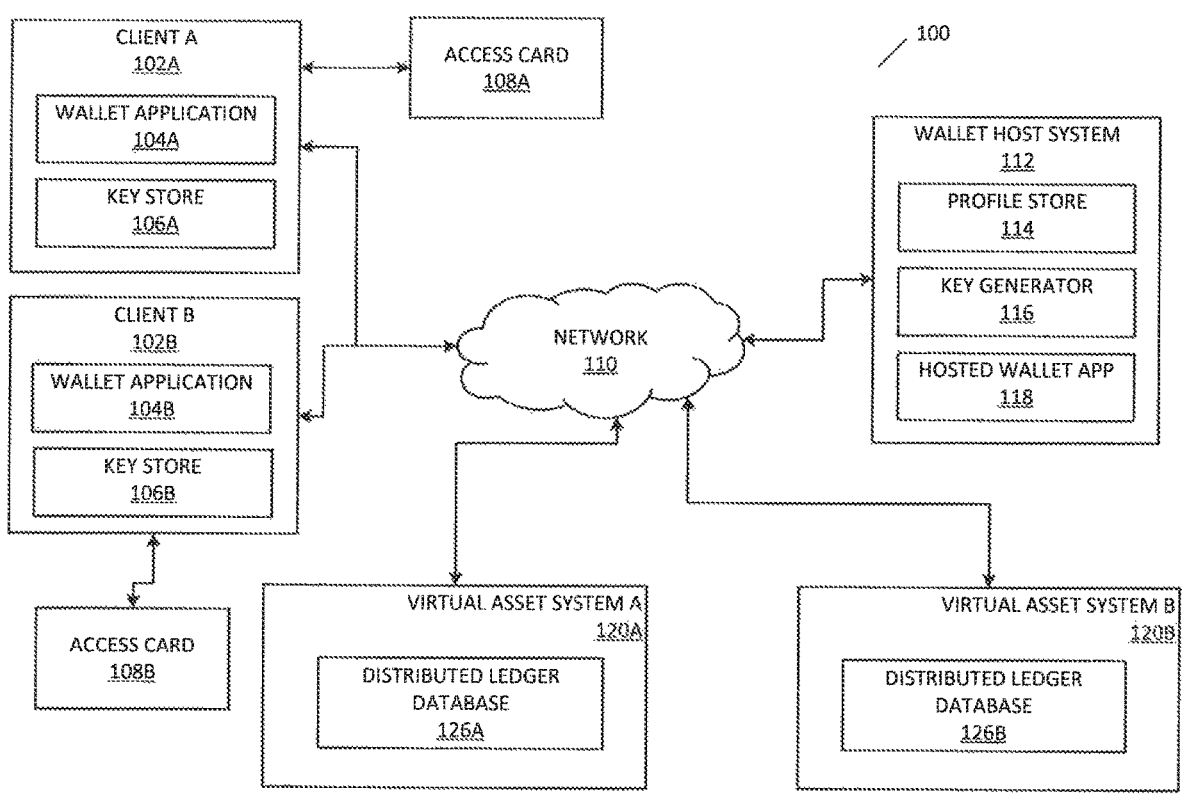
FIG. 1 depicts an example network diagram presented in accordance with one or more embodiments.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent (or any patent or patent application claiming priority hereto). On the contrary, the intention is to cover all modifications, equivalents and alternatives falling within the spirit and scope of this disclosure and the claims. Many changes may be made to the particular embodiments and details disclosed herein without departing from such spirit and scope.

In showing and describing preferred embodiments in the appended figures, common or similar components, features and elements are referenced with like or identical reference numerals or are apparent from the figures and/or the description herein. The figures are not necessarily to scale and certain features and certain views of the figures may be shown exaggerated in scale or in schematic in the interest of clarity and conciseness.

When reference numbers are followed by a lowercase letter (e.g. connectors 110*a*, 110*b*), they are each the same type of component or item (e.g. a connector 110) having the same features described herein and shown in the appended drawings, or which may be apparent therefrom, for the commonly referenced feature (e.g. connector 110) and each other, but having a different location, use or other characteristic(s). Parenthetical phrases starting with "e.g.", such as (e.g. tool string), are meant to provide one possible example of the referenced feature or circumstance that may occur in some instances. Such examples are not required for every embodiment or any claims, except and only the extent as may be explicitly provided otherwise herein.

As used herein and throughout various portions (and headings) of this patent (including the claims), the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular features and components. As one skilled in the art will appreciate, different persons may refer to a feature or component by different names and this document does not intend to distinguish between components and features that differ in name but not function. Also, the terms "including" and "comprising" are used herein and in the appended claims in an open-ended fashion, and thus should be interpreted to mean "including, but not limited to . . . ".

Reference herein and in the appended claims to components, features and aspects in a singular tense does not necessarily limit the present disclosure or appended claims to only one such component, feature or aspect, but should be interpreted generally to mean one or more as may be suitable and desirable in each particular instance. The use of "(s)" in reference to an item, aspect, component, feature or action (e.g. "surface(s)") should be construed to mean "at least one", except and only to the extent as may be expressly specified otherwise herein or in a particular claim hereof and only for such specific references, claim(s) and any claim(s) depending therefrom.

As used throughout this patent, the following terms have the following meanings, except and only to the extent as may be expressly specified otherwise:

The term "and/or" as used herein provides for three distinct possibilities: one, the other or both. All three possibilities do not need to be available—only any one of the three. For example, if an embodiment of a component is described as "having a collar and/or a coupling", it may include only one or more collars, only one or more couplings or at least one of each. Thus, the use of "and/or" herein does not require all three possibilities, just any one or more of the three possibilities. A claim limitation herein that recites "having a collar and/or a coupling" would be literally infringed by a device including only one or more collars, one or more couplings or both one or more couplings and one or more collars.

The terms "blockchain" and variations thereof generally refer to and include one or more systems in which a record of transactions of one or more types of virtual assets is maintained across several computers that are linked in one or more networks, or any other modes or systems in which, or with which, virtual assets may be transferred between owners, or a combination thereof. Thus, "blockchain" is used herein to refer to and include both blockchains and any other virtual asset transfer techniques and modalities. Accordingly, no part of this patent, including the claims, is limited by the type or nature of system with which virtual assets may be transferred between owners, except and only to the extent as may be expressly specified otherwise herein or in a particular claim hereof, and only for such reference or claim(s) and any claim(s) depending therefrom.

The terms "card", "crypto-card" and variations thereof refer to and include one or more cards and any other form of hand-held, pocket, wallet or similar-sized devices (e.g. flash drives, memory sticks, key fobs, chips, pendants, key chain accessories, charms, money clips, sleeves, wearable or implantable devices and the like, or a combination thereof) that store, display or provide access to information (e.g. ownership, location, wallet information, public and private keys) relating to one or more virtual asset wallets or virtual assets, or a combination thereof.

The terms "coupled", "connected", "engaged" and the like, and variations thereof refer to and include either an indirect or direct connection or engagement. Thus, if a first device couples to a second device, that connection may be through a direct connection, or through an indirect connection via other devices and/or connections, except and only to the extent as may be expressly specified otherwise herein or in a particular claim hereof, and only for such reference or claim(s) and any claim(s) depending therefrom.

The term "decentralized" and variations thereof refer generally to an environment or peer-to-peer marketplace in which transactions of virtual assets can be performed between two entities without a third party intermediary and/or an overseeing party. It should be understood, however, that no part of this patent, including the claims, is limited by the nature of the exchange, network, mode or process of transacting virtual assets, except and only to the extent as may be expressly specified otherwise herein or in a particular claim hereof, and only for such reference or claim(s) and any claim(s) depending therefrom. Accordingly, the involvement of decentralized exchanges is not required for all embodiments of the present disclosure.

The terms "initiate", "submit", "request", "effect" and the like and variations thereof, when used in connection with a blockchain transaction, are typically used herein to refer to providing any required information to the appropriate destination (e.g. blockchain), complying with any rules or procedures and taking any other actions needed to help cause the transaction to be consummated.

A "merchant" is a person who provides goods or services to others.

The terms "person", "purchaser", "recipient", "cardholder", "user", "owner", "party" and the like, and variations thereof, mean and include one or more humans, legal entities, virtual entities, robots or robotic components, artificial intelligence-driven components/circuitry, other entities or components and the like.

The terms "private key", "public key" and variation thereof are, or include, information used to identify, indicate the location or ownership of, provide access to or allow the transaction of a particular virtual asset, or a combination thereof. A private key and a public key are typically paired mathematically so that the two can be compared to get a match or used to identify, show the location or ownership of, provide access to or transact a particular virtual asset, but the private key normally cannot be mathematically derived from the public key. The private key is typically an extremely large number used to create digital signatures which can easily be verified (e.g. without revealing the private key) and may be used to generate the associated public key, which is typically also an extremely large number. The private key is often described as serving like a conventional password and the public key as the (e.g. blockchain or wallet) address for the subject virtual asset. Technically, the "public address" of a virtual asset may be a hashed version (compressed and shortened) of the public key and may be generated by the public key. For ease of reading this patent, the terms "public key" and variations thereof incorporate, or represent, the public address. While the terms "public key" and "private key" are used in the above manner with respect to various embodiments of this patent, this disclosure and the appended claims are not limited to the above description. Moreover, the terms "public key" and "private key" can represent any desired information relating to virtual asset wallets, virtual assets and/or the storage, security, ownership, address, location and/or transaction thereof, or a combination thereof. Accordingly, the terms "public key" and "private key" are not limited to only the private key and public key as those terms are used at the time this specification was prepared or any other particular time, except and only to the extent as may be expressly specified otherwise herein or in a particular claim hereof, and only for such reference or claim(s) and any claim(s) depending therefrom.

The "transfer" of virtual assets is generally used herein as shorthand for, and synonymous with, a change in ownership of the virtual assets.

The terms "virtual asset", "crypto" and variations thereof generally refer to digital representations of one or more things, items, concepts or the like that have, or can have, value and can be digitally traded, transferred, used for payment or investment purposes, or the like, such as cryptocurrency, virtual currency, digital currency, digital tokens, gaining tokens, cryptocurrency tokens, non-fungible tokens (NFTs), utility tokens, governance tokens, other digital, digitized and blockchain assets and the like. It should be understood that no part of this patent, including the claims, is limited by the type of virtual asset, except and only to the extent as may be expressly specified otherwise herein or in a particular claim hereof, and only for such reference or claim(s) and any claim(s) depending therefrom.

The terms "wallet", "virtual wallet", "digital wallet" and variations thereof as used herein generally refer to or include electronically-stored information (e.g. payment information, location information, passwords, private and public keys, biometric data and the like) relating to one or more virtual assets, the electronic medium itself (e.g. software, programming, coding), an interface useful to access such information, one or more capabilities, such as identifying, locating or initiating the change of ownership of virtual assets, or a combination thereof. It should be understood that no part of this patent, including the claims, is limited by the nature or features of the wallet, except and only to the extent as may be expressly specified otherwise herein or in a particular claim hereof, and only for such reference or claim(s) and any claim(s) depending therefrom.

It should be noted that any of the above terms may be further explained, defined, expanded or limited below or in other parts of this patent. Further, the above list of terms is not all inclusive, and other terms may be defined or explained below or in other sections of this patent.

Turning to FIG. 1, an example network diagram is presented in accordance with one or more embodiments. The network diagram 100 includes one or more client devices 102A, 102B and so on, communicably connected to a wallet host system 112 and one or more virtual asset systems 120 across a network 110. Although the various components and modules in the system are presented in a particular configuration, it should be understood that in alternative embodiments, the various components and modules can be differently distributed across the network diagram. The network 110 may include one or more different types of networks, such as wired or wireless networks, wide area networks, local area networks, short range networks, and the like.

The network 110 includes exemplary first client device A 102A in which one or more wallet applications 104A are stored or can be accessed and second client device B 102B in which one or more wallet applications 104B are stored or can be accessed. In various embodiments, the client device 102 may be an electronic device configured to run the wallet application 104, and may include one or more computing devices, such as a mobile device, laptop computer, desktop computer, tablet device, wearable device, and the like. However, no part of this patent, including the claims, is limited to or by the type of client device 102, except and only to the extent as may be expressly specified otherwise herein or in a particular claim hereof, and only for such reference or claim(s) and any claim(s) depending therefrom.

The wallet app 104 may have any desirable features and capabilities. In some embodiments, the wallet application 104A, 104B may be configured to read one or more codes from a virtual asset access card 108A, 108B, another wallet app 104 on another device 102 and the like. According to some embodiments, the wallet application 104A may include functionality to read representations corresponding to public and/or private keys on, or, from the card 108, another wallet app 104 on another device 102, and so on. For example, the wallet application 104A may enable client A 102A to read one or more graphic or device, such as machine-readable optical codes (e.g. QR codes), from the card 108 another wallet app 104, etc.

When included, the virtual asset access card 108 may have any suitable form, construction, components, features, use and operation. For example, the card 108 may provide access to virtual assets, be used to track, use, transfer and transact virtual assets (e.g. from anywhere at any time), have other capabilities and benefits or a combination thereof. For other examples, the card 108 can carry, display or provide access to one or more public and/or private keys or other virtual asset or wallet, location, identification, ownership, other information or a combination thereof, which can be represented in any suitable manner (e.g. QR codes, other graphics, symbols, magnetic strips, RFID tags or smart labels or other form of electronic media). For yet other examples, the card 108 may be any suitable electronically-coded card, electronic data carrier card, electronic card for storing and/or transmitting data, electronic chip card containing programming for storing information, smart card constructed at least partially of metal, plastic, other material or a combination thereof, data carrying or transmitting card with one or more QR Codes, RFID tags, RFID labels, magnetic strips or a combination thereof, encoded smart card containing data and/or programming, encoded smart card containing one or more proximity payment devices (e.g. transponders), consumer card (e.g. containing an integrated circuit chip), payment card, magnetic data carrier card, card featuring one or more integrated circuits. The card may be "contactless" and/or contact-actuated and useful in financial, security, retail, transport, vending industries or any other desired applications. The card 108 may be constructed of any suitable material for durability, longevity, water-resistance, flexibility, ease of permanent printing of information thereon or affixing devices thereto, any other purposes or a combination thereof.

Still referring to FIG. 1, in some embodiments, the exemplary wallet application 104A may include computer readable code stored on a computer readable medium of client A 102A, and executable by one or more processors of client A 102A and be configured to generate, store and/or display virtual asset wallets for a user of client A, initiate virtual asset transactions (e.g. via one or more blockchains) or a combination thereof. In various embodiments, the wallet application 104A may be configured to initiate the purchase of virtual assets for a wallet associated with the wallet app 104A, a virtual asset access card 108 or elsewhere, effect the change of ownership of virtual assets from one wallet to a different wallet (e.g. associated with the wallet app 104A, a virtual asset access card 108, a wallet app 104 on another device 102), and the like. The exemplary wallet application 104A may include functionality to duplicate, or "clone", a wallet such that the wallet, and the associated virtual assets, are accessible by more than one user and/or from multiple devices 102 (e.g. other computing devices, virtual asset access cards 108 and the like).

In many embodiments, the wallet app 104 can be used to generate public and private keys and/or virtual asset wallets associated with the wallet app 104, one or more virtual asset access cards 108, other wallet apps 104, other devices 102 or a combination thereof. If desired, the wallet application 104 may manage public and private key pairs corresponding to virtual asset wallets managed by the wallet app 104, such as by storing the public and/or private keys in one or more key stores 106. In some embodiments, the key store 106A, 106B may include a data structure in which public and private keys associated with the wallet app 104A, 104B are stored. The data structure may, for example, be stored on one or more persistent storage devices within client A 102A and/or communicably coupled to client A 102A, such as external memory devices, cloud storage, and the like.

The exemplary wallet app 104A may communicate with one or more "on-ramp" software or service providers or other resources to allow the user to purchase virtual assets. To associate virtual assets with a virtual asset access card 108, for example, the wallet app 104A may simply require scanning the card's public key and entering payment (e.g. credit card) information to purchase virtual assets through an on-ramp provider (e.g. Transak™). In the present embodiment, a similar method can be used to buy and associate virtual assets with one or more wallets in the user's wallet app 104A or associated with other wallet apps 104 or devices 102.

Still referring to FIG. 1, the exemplary network diagram 100 also includes a wallet host system 112, which may include one or more servers or other computing devices, or some combination thereof. In some embodiments, the wallet host system 112 includes, or has access to, a profile store 114 having one or more data structures containing information relating to users of the wallet application 104 across various devices, such as client A 102A, client B 102B and so on. For example, the profile store 114 may include information identifying one or more users and/or more complex information, such as user profiles, private and/or public key information, user preferences, and the like. When included, the profile store 114 may be stored on one or more hardware storage devices either within a server or other device of the wallet host system 112, or may be accessed from elsewhere across network 110, such as in cloud storage.

The exemplary wallet host system 112 also includes computer executable modules, such as a key generator 116 and/or a hosted wallet app 118. The hosted wallet app 118 may include computer readable code utilized by the wallet host system 112, such as to enhance the functionality of the wallet application 104 on the client devices 102. For example, the hosted wallet app 118 may include functionality to generate QR codes or other optical, or otherwise readable, codes for private/public key pairs at the request of a wallet application 104. To that end, the wallet host system 112 may also include a key generator 116. The key generator 116 may be hosted in the wallet host system 112 or elsewhere across network 110, for example through a third party library. The key generator 116 may be used to generate public/private key pairs. In some embodiments, the key generator 116 and the hosted wallet app 118 include computer executable instructions stored on one or more storage devices within the wallet host system 112 and executable by one or more processors within the wallet host system 112.

Still referring to FIG. 1, according to one or more embodiments, the wallet application 104 and/or wallet host system 112 may be configured to handle multiple types of virtual assets (e.g. multiple cryptocurrencies) and, therefore, interact with multiple blockchains (networks, databases, etc.). For example, the illustrated network diagram 100 is shown including a first exemplary virtual asset system A 120A and a second exemplary virtual asset system B 120B. Each of the illustrated virtual asset systems A 120A, B 120B may include numerous network devices, be associated with a particular type of virtual asset (e.g. a particular cryptocurrency) and include one or more respective distributed ledger databases 126A, 126B. The distributed ledger database 126 may be a data structure accessible by numerous electronic device nodes participating in a blockchain and include a recorded entry for each transaction, such as wallet addresses of a sender and recipient of a transaction, along with the transaction amount. Other data may be recorded in a distributed ledger database 126, such as timestamp information, transaction identifier, and the like. As such, when a transaction occurs for a particular virtual asset (e.g. cryptocurrency), the associated blockchain is typically modified to show the reallocation of the asset involved. For example, the distributed ledger database 126A or 126B may be updated.

Figure 2A:
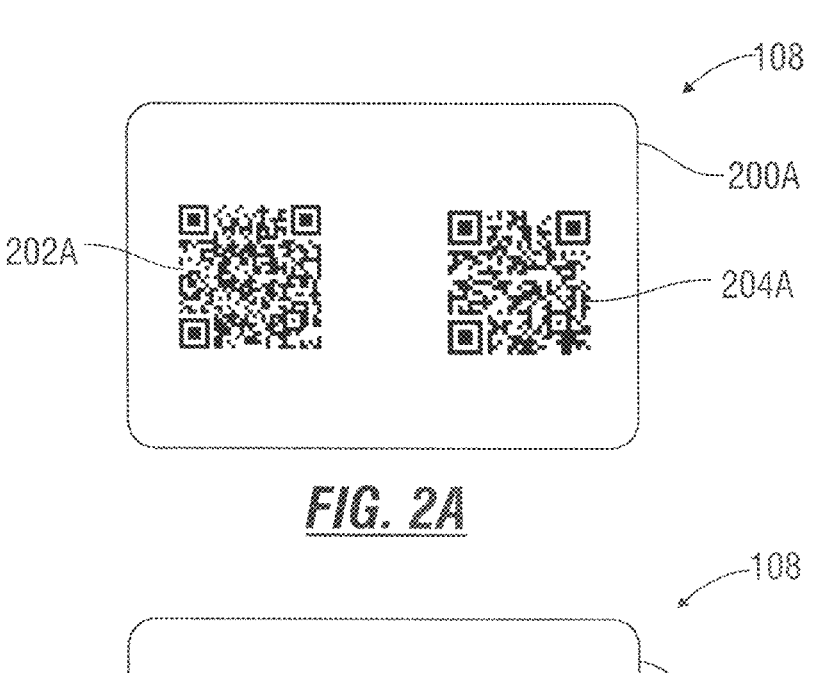
FIGS. 2A-2C are front views of exemplary virtual asset access cards according to various embodiments.
Figure 2B:
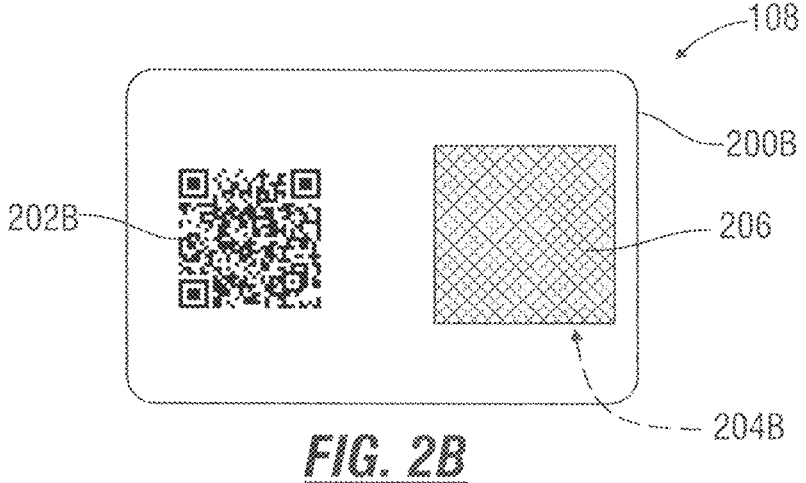
Figure 2C:
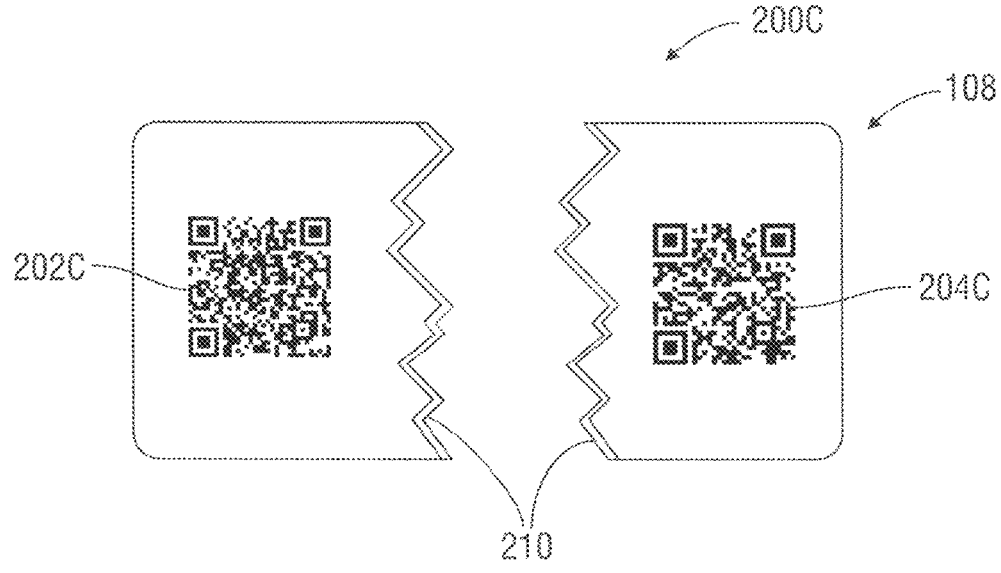

Turning now to FIGS. 2A-2C, a set of virtual asset access cards 108 are presented as cards 200A-C according to various embodiments. The cards 200A-C may have any suitable form, construction, components, use and operation, such as described elsewhere herein and shown in other appended figures. Thus, the descriptions and illustrations of virtual asset access cards (e.g. cards 108, 300) in other parts of this patent are hereby incorporated by reference herein for the embodiments of FIGS. 2A-C. The particular cards 200A-C of these embodiments are plastic wallet-sized cards.

Figure 11:
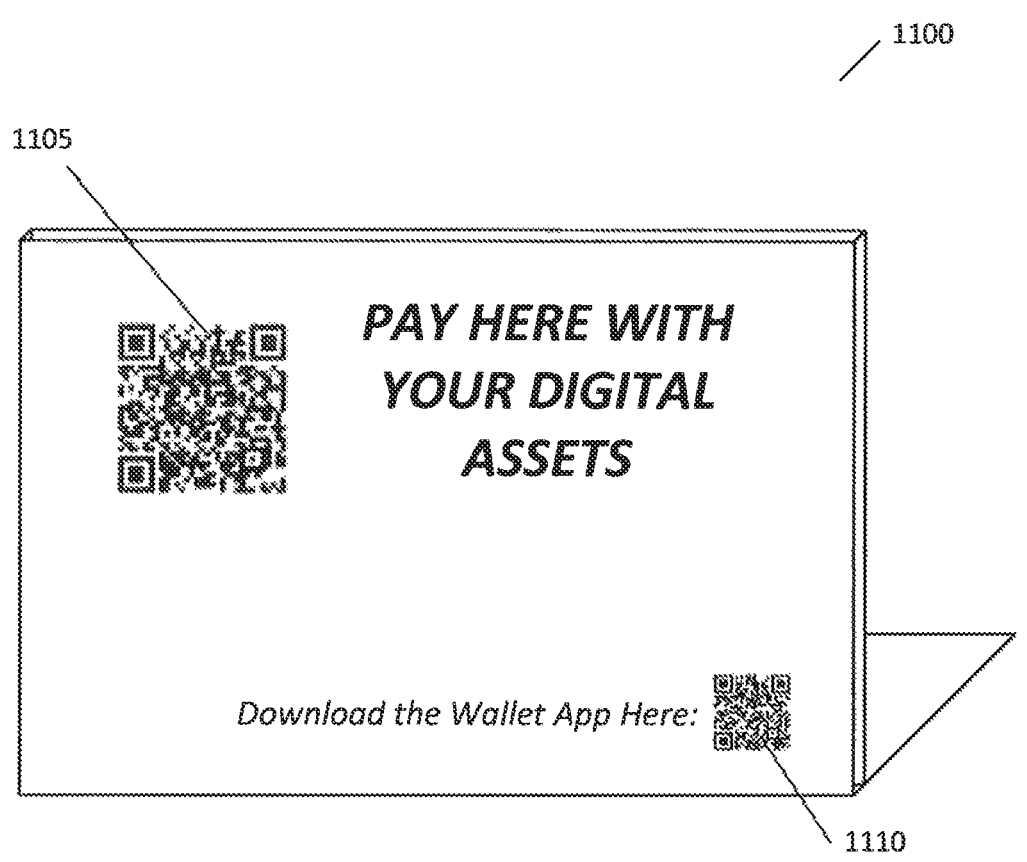
FIG. 11 is front view of an exemplary merchant point-of-sale display according to one or more embodiments of the present disclosure.

In FIG. 2A, the illustrated cards 200A has printed on it a public key 202A (e.g. a first graphic, such as a QR code), and a private key 204A (e.g. a second graphic, such as a QR code). However, the public and private keys 202A, 204A could be presented or provided in any other desired form or format (e.g. via other graphic, magnetic strip, RFID technology, etc.) and could include any other or additional information. For example, the card 200A may include additional information, such as instructions, identifying information, or the like. In some embodiments, the card 200A may include a machine-readable optical code, or other information, for accessing a wallet app host site (e.g. QR code 1110, FIG. 11), such as a link to a website, app store, app distribution platform, hosting platform, or the like. Various information on the exemplary card 200A may be in the form of one or more readable codes (e.g. a machine-readable optical code, QR code, bar code), magnetic strips, RFID technology and the like.

As mentioned above, in some embodiments, the public key 202A may be read by a wallet application 104 (e.g. FIG. 1) of a client device 102 to access the virtual assets associated with the wallet corresponding with the public key 202A. In some embodiments, the wallet application 104 may obtain (e.g. from a relevant blockchain) a virtual asset balance associated with the virtual asset wallet in response to reading the public key information 202A, and display that information within the wallet app 104 and/or on the device 102 associated therewith.

FIG. 2B depicts an alternative embodiment of the virtual asset access card 200. In particular, the virtual asset access card 200B also includes public key information 202B, which is presented in the form of a QR code. In this example, the private key information 204B (e.g. QR code) is also provided on or accessible via the card 200B, but is concealed with a security device (a.k.a. concealer).

When included, the concealer(s) may be used to help prevent unauthorized use of the card 108 and/or access to the private key, for any other purposes or a combination thereof. The concealers may have any suitable form, configuration, components, construction and operation. The concealer may be temporary, semi-permanent or permanent. In some embodiments, the concealer may be movable to conceal and reveal the desired information, such as a door, cover, sheath, sleeve, etc., or be otherwise reusable. If desired, the concealer may be lockable to allow and deny access to the desired information (e.g. only with permission). The illustrated concealer is a cover 206 (e.g. scratch-off material, peel-off material, panel, tab, door or the like). As such, the exemplary concealer should only be removed or removable by the purchaser, or owner, of the card 200B, or whomever is otherwise given full access to the virtual assets associated with the corresponding wallet. For example, the cover 206 may include temporary scratch-off, peel-off or other material initially covering the desired information (e.g. the private key 204B). Thus, a person in possession of the card 200 may "load" virtual assets into a wallet associated with the card using the visible information associated with the public key 202 without having access to the private key 204. A subsequent person receiving the illustrated card 200B, for example in the form of a gift or purchase from a merchant, can then remove the concealer to access the private key 204B in order to gain full access to (spend or transfer) the virtual assets in the wallet(s) associated with the card 200B.

Turning to FIG. 2C, yet another example virtual asset access card 200C is depicted. In this example, the card 200C may be separable or have multiple, selectively detachable components (collectively, the "separable card"), such as to allow separation of the information associated with the public key 202C from the information associated with the private key 204C (or any other information or have a different purpose). For example, it may be desirable at certain times for the cardholder to maintain the convenience of having the public key 202C on his/her person (e.g. to be able to receive virtual assets), but safeguard the private key 204C at another (e.g. secure) location, such as at home, office, in a safe, safe deposit box, etc. when it is not needed. As another example, it may be desirable for the cardholder to provide only the public key 202C to another user to collect payment or receive virtual assets (via virtual asset transaction), while maintaining the private key information 204C such that the other user (or anyone else) does not have access to the private key 204C for the associated wallet(s) (e.g. and cannot remove virtual assets therefrom).

The separable card may have any desired form, configuration, components and operation. For example, the separable card may have first and second mateable portions and/or involve the use of one or more couplers for separation and reattachment thereof. In some embodiments, the separable card may have a first portion that fits within a second portion and can be removed therefrom. For example, the card may include an outer sheath (e.g. providing access to certain information, such as a public key) and a removable card or insert (e.g. providing other information, such as an associated private key 308, FIG. 3B) that fits in the sleeve or sheath and may thus be separable therefrom. In this embodiment, the separable card 200C includes at least first and second separable portions and one or more unique connectors 210 associated therewith. After the first and second portions of the illustrated card 200C have been separated, either portion can only be recoupled to the other, and will not couple with any portion of any other card 108 or other device, thus preserving the association of the information (e.g. corresponding public and private keys 202C, 204C) provided on or in the respective portions of the card 200C, for any other purposes or a combination thereof.

The connector(s) 210, when included, could have any suitable form, configuration and operation. For example, the connector 210 may include a watermark (e.g. randomly generated), other graphic, code, imprint or the like that extends across a seam or intersection where the first and second portions of the card 200C can be separated and returned. For another example, the connector 210 may include a unique (e.g. randomly generated) arrangement of one or more pins/receivers or other components at, or proximate, to the seam or intersection where the first and second portions of the card 200C can be separated and returned. In the illustrated embodiment, the connector 210 includes a uniquely shaped mating edge (e.g. randomly generated via laser cutting, formed with perforations, or the like) that forms the seam, or intersection, of the first and second portions of the card 200C so that only the first and second portions of the same card 200C can be fit back together and will not fit with any portion of any other card 200. However, other embodiments may involve one or more connectors 210 (hook/loops, snaps, screws, pins, mating features, magnetic devices, etc.) that may or may not be unique to the particular card 200. Thus, the present disclosure is not limited to the use of only connectors 210 that provide a unique connection.

Figures 3A, 3B, 3C:
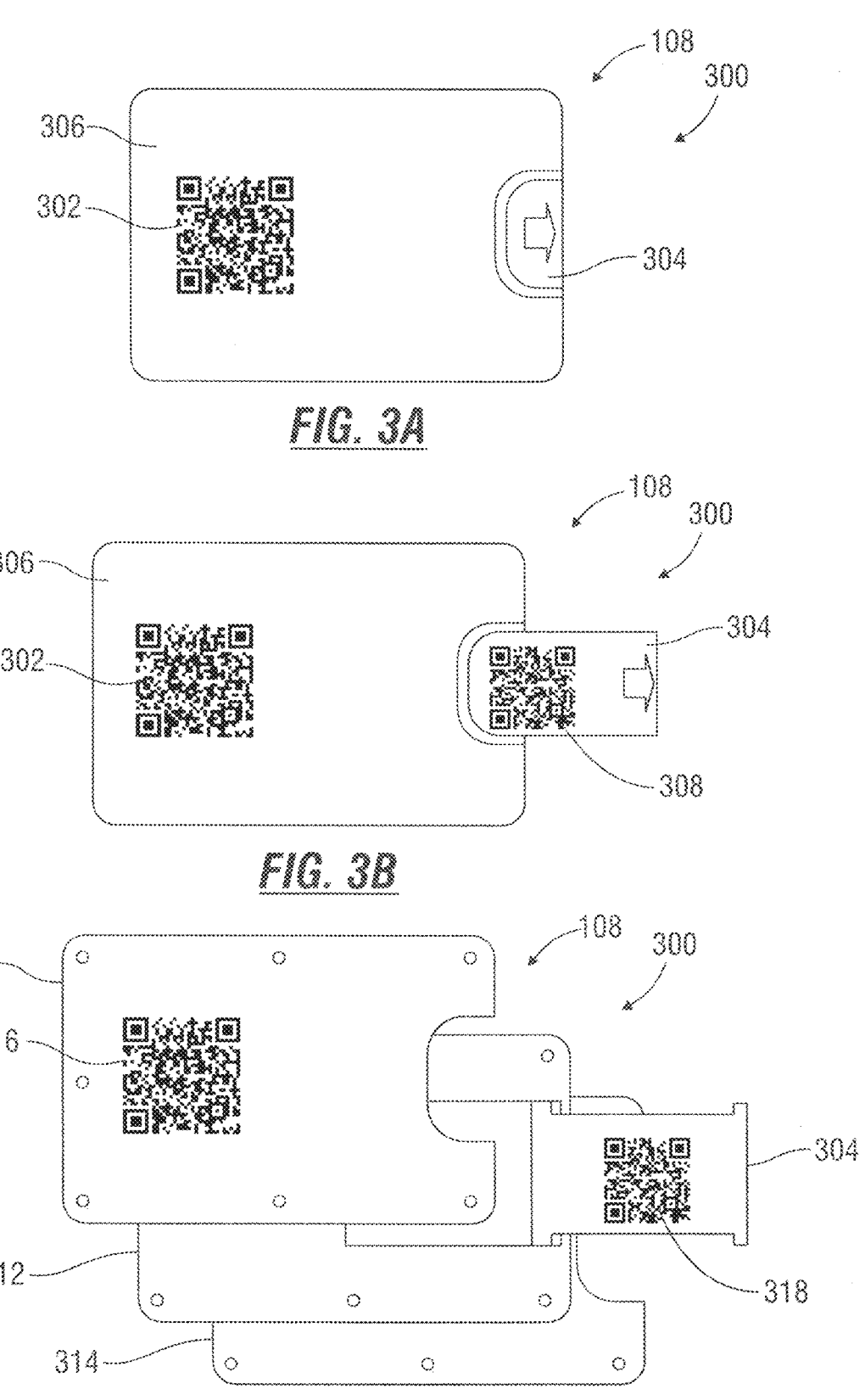
FIGS. 3A-3C are front views of other exemplary virtual asset access cards in accordance with one or more embodiments.

Referring now to FIGS. 3A-3C, other examples of virtual asset access cards 108 are presented as cards 300. These cards 300 may have any suitable form, construction, components, use and operation, such as described elsewhere herein and shown in other appended figures. Thus, the descriptions and illustrations of virtual asset access cards (e.g. cards 108, 200A-C) in other parts of this patent are hereby incorporated by reference herein for the embodiments of FIGS. 3A-C. In FIGS. 3A-B, the illustrated virtual asset access card 300 includes first and second portions 304, 306 configured to allow certain information to be selectively concealed, protected and/or secured. For example, public key information 302 is shown provided on the illustrated second portion 306 (e.g. on the outside of the card 300) and private key information 308 is shown provided on the first portion 304, which, in this instance, is a panel that slides in and out relative to the second portion 306. The exemplary first portion 304 is thus slidably moveable between a retracted position (e.g. FIG. 3A) and an extended position (e.g. FIG. 3B) to selectively conceal/protect/secure or expose the private key information 308. In this embodiment, the relationship and configuration of the portions 304, 306 of the card 300 serves as a security device, or concealer. In some configurations, the first portion 304 may be entirely removable from the second portion 306, so that the card 300 can be a separable card. However, any other information may be provided on the first and second portions 304, 306 and any other forms of engagement (e.g. snapping, pivoting, clipping) therebetween and concealers, when included, may be used.

In the embodiment of FIG. 3C, the first (slidable) portion 304 (bearing or providing access to one or more private keys 318 or other desired information) of the card 300 is sandwiched between front and rear panels 310, 314, which can bear or provide access to other information, such as public key information 316. For example, the first portion 304 may slidably engage a middle panel 312 disposed between the front and rear panels 310, 314. The illustrated panels 310, 312, 314 may be coupled together with pins, screws, rivets, epoxy, adhesives, integrally formed or associated in any other suitable manner, to form a multi-layer card 300. A multi-layer card may be desirable, for example, to assist in protecting, concealing and/or securing information provided on or accessible via the first portion 304, for any other purpose or a combination thereof. In some embodiments, the front and rear panels 310, 314 may be constructed at least partially of metal (e.g. aluminum) to help protect the information (e.g. private key information 318 provided via Near-field RFID label or tag) on, or which is accessible, via the first portion 304 from unauthorized electronic access thereto, for any other purposes or a combination thereof. In some configurations, the first portion 304 may be entirely separable from the panels of the card 300 (e.g., panels 310, 312, 314, so that the card 300 can be a separable card.

If desired, a permission-based, or lockable, concealer that allows selective access to particular information (e.g. the private key 318) via one or more portions of the card 300 may be used. For example, access to the information may be given upon entry of a password, entry of a unique code sent (e.g. via text) or otherwise provided to the user, upon "loading" of virtual assets into one or more wallets associated with the card 108, upon activation of the card, via biometrics (e.g. via facial recognition, voice, signature, fingerprint, etc.) or a combination thereof. For another example, the concealer may be a process performed by a wallet app 104 (e.g. FIG. 1) (e.g. upon scanning a code or other graphic or information on the card 108 or other location). If desired, any embodiment of the virtual asset access card may include multiple concealers. For example, the first portion 304 of the exemplary cards shown in FIGS. 3A-C may be fingerprint actuated.

FIG. 4 shows a flowchart 400 of a technique for using an exemplary virtual asset access card (e.g. cards 108, 200, 300) to implement a change to a blockchain, according to one or more embodiments. It should be understood that the particular flow of this flow diagram is used only to exemplify certain embodiments. In other embodiments, any of the various acts or components depicted in the flow diagram 400 may be omitted, or the acts or components may be performed in a different order, or even concurrently. In addition, other embodiments may include additional acts or components not depicted as part of the flow diagram. Further, the various acts may be described as being performed by particular devices for purposes of explanation, but should not be considered limited to those devices.

The exemplary flowchart 400 begins at block 405, where a first optical code is read from a virtual asset access card. The optical code may alternatively be any readable information that provides access to the public key of a virtual asset wallet associated with the card. In some embodiments, the optical code may be provided on or within the card. Further, as described above with respect to FIG. 1, a wallet app 104 on a client device 102 may be configured to read the optical code from the card. At block 410, the public key is accessed from the first optical code. For example, the wallet app 104 may be configured to determine a public key from the information provided on the virtual asset access card.

The illustrated flowchart 400 continues at block 415, where the wallet app 104 receives a request to perform a transaction involving the wallet address. For example, the wallet app may provide a user interface from which a user of the wallet app can request to perform a transaction, such as the transfer of virtual assets to the wallet associated with the public key, purchasing virtual assets for the wallet associated with the public key, and the like.

The exemplary flowchart 400 concludes at block 420, where the wallet app 104 submits a change to the blockchain associated with a virtual asset for the wallet address based on the request. In many instances, the wallet app enables a decentralized transaction between users (e.g. without a third party intermediary and/or an overseeing party). In some embodiments, the wallet app may include, or access, an application programming interface ("API") for a particular blockchain in order to modify an associated distributed ledger, which will then be distributed among the nodes of the blockchain to indicate the transaction. Typically, the transaction initiated with use of the public key associated with a subject wallet will add virtual assets to that wallet.

In other embodiments, the flowchart 400 equally applies when accessing and utilizing the private key of a virtual asset wallet associated with the card, such as to effect the transfer virtual assets into that wallet. Likewise, the same process of flowchart 400 can be similarly used with respect to public and private keys associated with wallets residing within the wallet app 104 or other wallet apps or devices.

FIG. 5 shows a flowchart 500 of a technique for using a virtual asset access card in association with a virtual asset wallet app 104, according to one or more embodiments. It should be understood that the particular flow of this flow diagram is used only to exemplify certain embodiments. In other embodiments, any of the various acts or components depicted in the flow diagram 500 may be omitted, or the acts or components may be performed in a different order, or even concurrently. In addition, other embodiments may include additional acts or components not depicted as part of the flow diagram. Further, the various acts may be described as being performed by particular devices for purposes of explanation, but should not be considered limited to those devices.

The flowchart 500 begins at block 505 where an exemplary client device reads a general optical code or other computer readable information from a virtual asset access card. As described above, in some embodiments, the card may include instructions to access the wallet app 104. Those instructions may be printed on the card, such as in human readable instructions or computer readable code or graphic, such as an optical code (e.g., QR code), from which a landing page for a wallet app can be reached, for example, in an app store, application distribution platform, server associated with the wallet app, or the like. Thus, in some embodiments, the information may be read by the client device by capturing image data of the card by a camera (scanner or other technology) of the client device to detect the information having the instructions. As such, at block 510, the exemplary client device can access the wallet app for download based on the general optical code provided on the access card.

The illustrated flowchart 500 continues at block 515, where the wallet app 104 is downloaded to the client device. The wallet app may, for example, be downloaded in accordance with directions provided by the landing page for the wallet app, which is reached by the general optical code. In some embodiments, downloading the wallet app may include a registration or enrollment process, such as providing identifying information for the user in order to create a user account with the wallet app 104 and/or to conform to regulations related to virtual asset wallet applications. In some embodiments, some or all of the enrollment data will be stored locally on the client device, and/or on a server or network storage associated with the wallet app, or some combination thereof.

At block 520, the exemplary wallet app 104 reads a first optical code and/or a second optical code from a virtual asset access card or other device(s). The exemplary first optical code and second optical code are associated with a public/ private key pair, respectively, such that by reading an optical code, the client device gains access to the public and private keys. As described above with respect to FIGS. 2A-3C, for example, the card (or other device) may include information comprising the codes, which can be read to access the public/private key pair that comprise a virtual asset wallet for a particular virtual asset. In some embodiments, the wallet(s) associated with the card (or other device) may already be associated with a virtual asset balance. For example, a merchant may provide a "pre-loaded" virtual asset access card, which includes the public/private key pair having a balance associated with it on a corresponding virtual asset blockchain. As such, the wallet app may register the wallet associated with the card (or other device) by accessing the public/private key pair provided thereon.

The exemplary flowchart 500 continues at block 525, where the wallet app 104 obtains a virtual asset balance. As an example, the wallet app may use the accessed public key of the card (or other device) to effectively scan the blockchain of a particular virtual asset and find all the virtual assets assigned to that public key. In some embodiments, the wallet app 104 may further be configured to apply an exchange rate to the balance to obtain a fiat value for the virtual asset balance in that wallet. The flowchart 500 concludes at block 530 where the wallet app presents the virtual asset balance in a user interface in the application.

In some embodiments, the exemplary virtual asset access card may be obtained (e.g. purchased) in any manner or at any desired location, such as convenience stores, and may be "pre-loaded" with virtual assets or may be loaded with virtual assets (e.g. by the merchant, customer, purchaser) at the time of its acquisition or later (e.g. by anyone at any desired time).

As described above with respect to FIGS. 2A-3C, in some embodiments, the private key may be at least temporarily concealed or stored (e.g. with one or more concealers and/or at another physical location), such that a wallet associated with the card can be "loaded" with virtual assets (e.g. by transferring ownership of virtual assets to an address associated with the wallet) using the public key, while leaving the associated private key concealed or safeguarded. Once loaded, the card can be turned over to successive users for full use, so long as such users have access to the private key for each wallet associated with the card. As such, any recipient of the card with access to the private key may fully access (spend, transfer, etc.) the virtual assets in the wallet(s) associated with the card.

Figure 6:
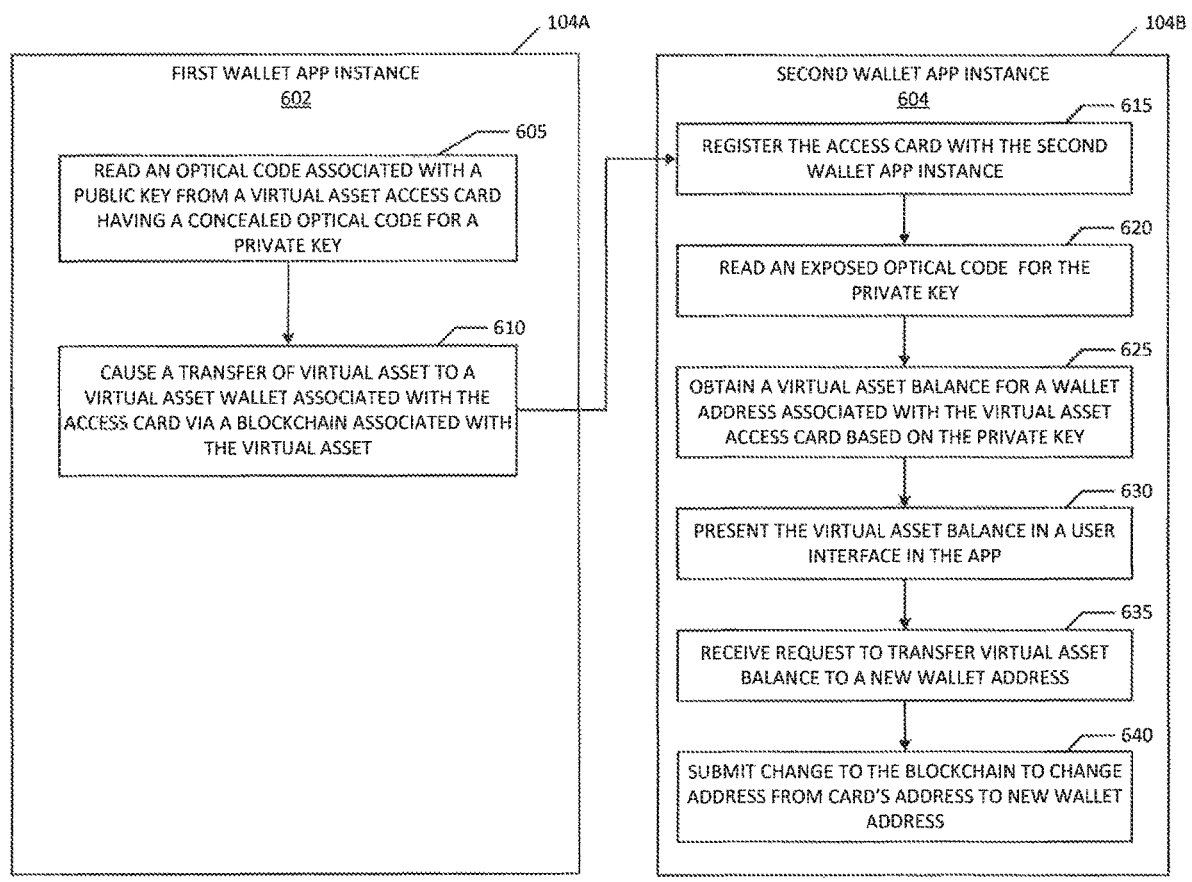
FIG. 6 shows a flowchart of a technique for providing a virtual asset balance associated with a virtual asset access card to a recipient, according to one or more embodiments.

FIG. 6 shows a flowchart 600 of a technique for initiating the effective transfer of virtual assets from a wallet associated with a virtual asset access card and providing a recipient with a balance of virtual assets on a blockchain associated with the wallet, according to one or more embodiments. It should be understood that the particular flow of this flow diagram is used only to exemplify certain embodiments. In other embodiments, any of the various acts or components depicted in the flow diagram 600 may be omitted, or the acts or components may be performed in a different order, or even concurrently. In addition, other embodiments may include additional acts or components not depicted as part of the flow diagram. Further, the various acts may be described as being performed by particular devices for purposes of explanation, but should not be considered limited to those devices.

At block 605, the illustrated flowchart 600 includes, at a first wallet instance 602 (104a), reading an optical code or otherwise obtaining information associated with a public key from a virtual asset access card (e.g. having a concealed optical code for a corresponding private key). The user of the exemplary first wallet app instance 602 may, for example, use a client device to scan the optical code to access the public key of a wallet associated with the card from within the wallet app. Then, at block 610, the illustrated first wallet app instance 602 may be used to effectively cause a transfer of virtual assets out of the wallet associated with the card via a blockchain associated with the type of virtual asset in play. That is, the exemplary wallet app may include an interface through which a user may submit transaction information to the blockchain for the distributed ledger to enable a virtual asset change of ownership. In many instances, the first wallet app instance 602 may enable a user to initiate decentralized virtual asset transactions (e.g. without a third party intermediary and/or an overseeing party).

The exemplary flowchart continues at block 615, where a second wallet app instance 604 (104B) registers the virtual asset access card. For example, a user of the first wallet app instance 602 may "load" the card and gift, or sell, it to a user of the second wallet app instance 604. In one or more embodiments, a user of the second wallet app instance 604 may register the card, such as described above with respect to FIG. 5.

The exemplary flowchart 600 continues at block 620, where the client device associated with the second wallet app instance 604 (i.e., a separate client device than the client device running first wallet app instance 602) reads an exposed optical code for the private key of a key pair associated with the card. In some instances, the recipient user (e.g., the user associated with the second wallet app instance 604) may open a concealer (e.g. remove a temporary, semi-permanent or permanent cover over the private key information) or otherwise expose or access the private key information. The private key information may be in the form of a printed optical code, such as a QR code, an RFID tag, magnetic strip or any other desired mechanism or feature which is readable by the client device.

Upon reading the private key, the exemplary second wallet app instance 604 may obtain a virtual asset balance for the wallet address associated with the card based on the private key at block 625. For example, the second wallet app instance 604 may review, or otherwise communicate with, the blockchain of a particular virtual asset to identify all the virtual assets associated with that private key. Then, at block 630, the exemplary wallet app instance 604 may present the virtual asset balance in a user interface in the wallet app.

In some embodiments, once the card is registered with the second wallet app instance 604, the card can be used by a user to affect virtual assets transactions (though, in many embodiments, registration may not be necessary). As an example, as shown at block 635, the second wallet app instance 604 may receive a request to have the ownership of a virtual asset balance changed from a wallet of the card to a new wallet address. The illustrated flowchart 600 concludes at block 640, where the second wallet app instance 604 submits a change to the blockchain to change the ownership of the virtual assets associated with the card wallet to another wallet, such as a second wallet associated with the second wallet app instance 604, another card, another wallet app and so on. For example, the user may wish to reassign the balance (or a portion thereof) associated with that wallet to a preexisting wallet address associated with the user, and the wallet app can include functionality to request, initiate or effect such transactions on the blockchain.

In some embodiments, another feature of the wallet app 104 (e.g. FIG. 1) is to clone a wallet (e.g. wallet address, key pair, other information) on the same wallet app, another wallet app or a virtual asset access card to a different location so the virtual assets associated with that wallet are accessible from other wallets and devices. As such, virtual assets may be effectively shared between users and/or devices without incurring any blockchain transaction fees because the wallet or information relating thereto is merely cloned and the address (owner) of the associated virtual assets on the blockchain is not changed.

In this regard, FIG. 7 depicts a method 700 of cloning a virtual asset wallet (e.g. associated with a virtual asset access card), according to one or more embodiments. It should be understood that the particular flow of this flow diagram is used only to exemplify certain embodiments. In other embodiments, any of the various acts or components depicted in the flow diagram 700 may be omitted, or the acts or components may be performed in a different order, or even concurrently. In addition, other embodiments may include additional acts or components not depicted as part of the flow diagram. Further, the various acts may be described as being performed by particular devices for purposes of explanation, but should not be considered limited to those devices.

The exemplary flowchart 700 begins at block 705, where the wallet app 104 receives a request to duplicate a virtual asset wallet associated with a virtual asset access card (but the wallet could be associated with the wallet app or another wallet app or device). For example, the wallet app 104 may include functionality to provide a user selectable option to clone the virtual asset wallet such that the virtual asset wallet can be made available to another user, for example at a local device and/or at a secondary device (and, thus, with a second user).

At block 710, the illustrated flowchart 700 includes reading, from within the wallet app 104, a first optical code and a second optical code associated, with the subject wallet (e.g. on the virtual asset access card). For example, as described above, the public key and private key may each be encoded in an optical code, such as a QR code, on or within the card. Thus, at block 715, the wallet app accesses a public key and a private key of a wallet address associated with the card by way of the accessed public key and private key optical codes.

The flowchart continues at block 720 where the exemplary wallet app 104 duplicates the public key and the private key. For example, the wallet app may generate a copy of the public key and the private key for local storage and/or for transfer to a secondary wallet app, such as a wallet app associated with a different user.

At block 725, according to some embodiments, the wallet app 104 provides the duplicated public key and private key to a second instance of the wallet app on a local device. For example, in some embodiments, the user interface for the wallet app may provide a secure technique for transferring the wallet to a secondary user or device. In one example, the user interface may allow the user to select, from a list of contacts (e.g. taken from a contact list on the device), the other user(s) to which the duplicated key pair should be provided. Then the key pair may be encrypted and securely transmitted to the second wallet app. If desired, the recipient(s) of the cloned wallet may be notified (e.g. by text) and provided instructions to accept the cloned wallet.

The exemplary flowchart 700 continues at block 730, where a transaction is processed from the first instance of the wallet app based upon the virtual asset access card. For example, the transaction may include instructing a block-chain to change the ownership of virtual assets to a third party, adding virtual assets to a wallet via purchase or transfer, or the like. The flowchart 700 concludes at block 735, if desired, where the wallet app causes a balance to be updated in the first instance of the wallet app and the second instance of the wallet app based upon the transaction. For example, the ledger entry associated with the change of ownership may be associated with the wallet address accessible via both the first wallet app and the second wallet app, regardless of which of the first wallet app and second wallet app (or user associated therewith) caused the transaction to occur.

In some instances, the wallet app may be used to pay in virtual assets at a merchant location by the cardholder simply scanning the private key associated with his/her wallet and also scanning the private key, or a "merchant graphic", associated with the merchant's virtual asset wallet. For example, the merchant graphic 1105 (e.g. FIG. 11), such as a QR code, may represent or contain public key and/or other information relating to the merchant's wallet and be provided on a simple merchant point-of-sale placard 1100 (FIG. 11), on a virtual asset access card, smart phone, tablet, or other device owned or presented by the merchant. The merchant graphic 1105 may be generated (e.g. with double encryption) to ensure the user (customer) cannot access a balance of virtual assets and/or any private key or other confidential information associated with the merchant's virtual asset wallet.

Figure 8:
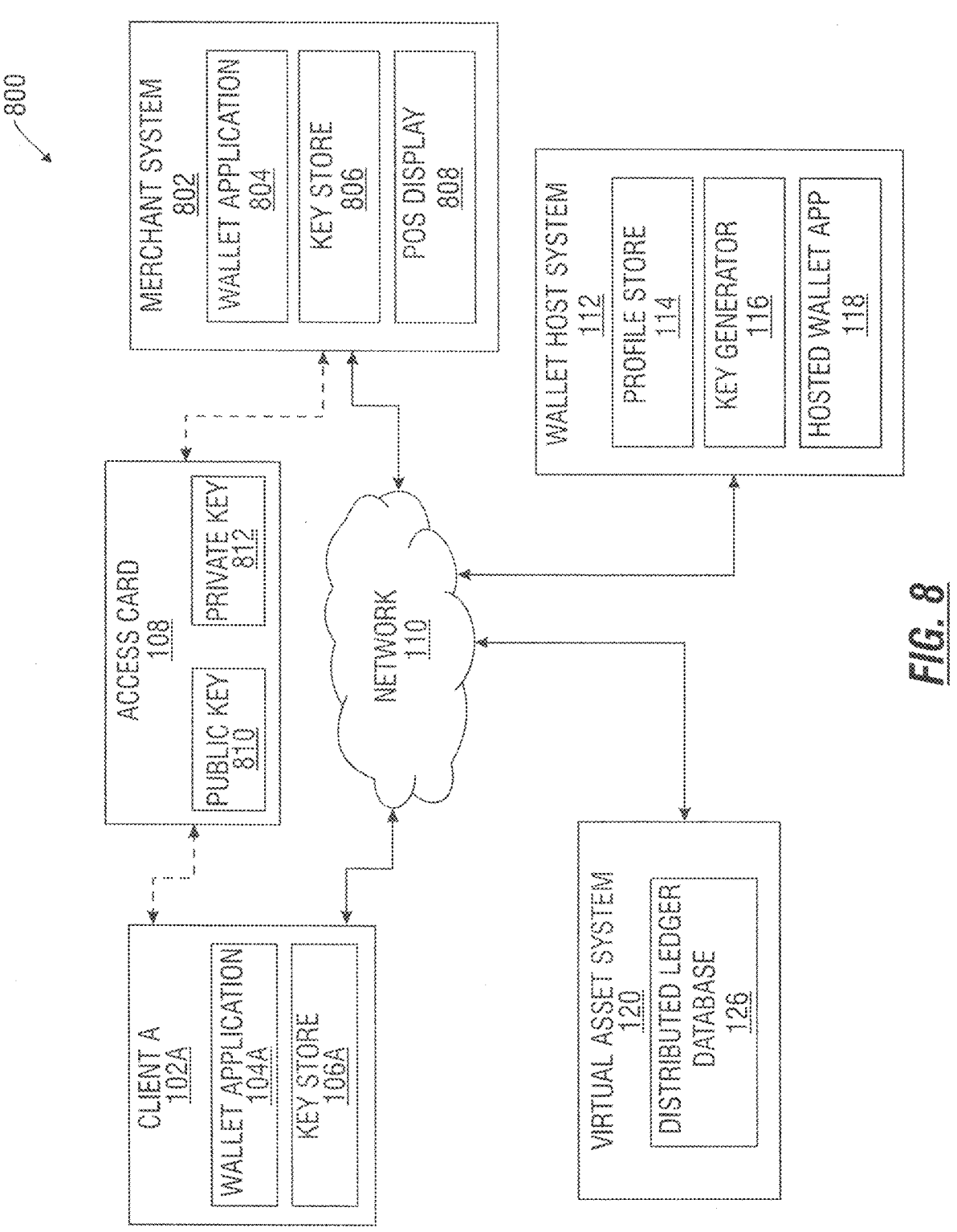
FIG. 8 depicts an example network diagram including a merchant system in accordance with one or more embodiments.

FIG. 8 depicts an example network diagram including a merchant system 802 in accordance with one or more embodiments. The illustrated network diagram 800 includes one or more client devices 102 communicably connected to a wallet host system 112 and one or more virtual asset systems 120 across a network 110. Further, a merchant system 802 is shown communicably coupled to other components across the network 110, and, in some embodiments, is communicably couplable to one or more virtual asset access cards 108. Although the various components and modules in the system are presented in a particular configuration, it should be understood that in alternative embodiments, the various components and modules can be differently distributed across the network diagram. Further, the network 110 may include one or more different types of networks, such as wired or wireless networks, wide area networks, local area networks, short range networks, and the like.

The exemplary network 110 includes a client device A 102A in which a wallet application 104A is stored. Client device A 102A may be an electronic device configured to run the wallet application, and may include a computing device such as a mobile device, laptop computer, desktop computer, tablet device, wearable device, and the like. Client device 102A may include a wallet application 104A which is configured to generate virtual asset wallets and/or to initiate virtual assets transactions on one or more blockchains, and may include a key store 106A which, as described above, includes one or more data structures to hold a private key and/or public key for a wallet registered with the wallet application 104A. The wallet application 104A may be comprised of computer readable code stored on a compute readable medium of client A 102, and executable by one or more processors of client A. The wallet application may manage public and private key pair corresponding to wallets managed by the wallet app by storing the public key and/or private key in key store 104A. In some embodiments, the key store 104A may be a data structure in which public and private keys managed by the wallet are stored. The data structure may be stored on one or more persistent storage devices within client A 102, and/or communicably coupled to client A 102A, such as external memory devices, cloud storage, and the like.

According to one or more embodiments, the wallet application 104 may be configured to read a code from a virtual asset access card 108 or other device. In some embodiments, the card 108 can carry, display or provide access to one or more public keys 810 and/or private keys 812 or other virtual asset wallet, location, identification, ownership or other information, which can be represented in any suitable manner (e.g. QR codes, RF ID tags or smart labels, other graphics, symbols, magnetic strip or any desired form of electronically accessible medium). The exemplary wallet application 104 may include functionality to read the representations corresponding to the public key 810 and/or private key 812 from the card 108, other wallets apps and other devices.

Still referring to FIG. 8, the exemplary network diagram 800 also includes a wallet host system 112 having one or more servers or other computing devices, or some combination thereof. The wallet host system 112 may include a profile store 114 having one or more data structures containing identifying information for users of the wallet application across various devices such as client A 102. Further, in some embodiments, the profile store 114 can include registration information for one or more merchants, such as a merchant associated with the merchant system 802. The profile store may be stored on one or more hardware storage devices, either within a server or other device comprising the wallet host system 112, or may be accessed from elsewhere across network 110, such as in cloud storage, or a combination thereof. The exemplary wallet host system 112 also includes computer executable modules, such as a key generator 116 and a hosted wallet app 118. The key generator 116 may be used to generate a public private key pair. In some embodiments, the key generator 116 and the hosted wallet app 118 may include computer executable instructions stored on one or more storage devices within the wallet host system 112, and executable by one or more processors within the wallet host system 112.

If desired, the exemplary hosted wallet app 118 may include functionality to facilitate a merchant system 802 using virtual assets to initiate transactions at a point-of-sale. For example, the hosted wallet app 118 may be configured to generate a merchant graphic used at a point-of-sale which may allow a user to perform transactions with the wallet application 104 and/or a virtual asset access card 108. According to some embodiments, the merchant graphic may be presented on a point-of-sale display 808 of the merchant system 802. If desired, the exemplary merchant graphic may be printed and manually displayed at the point-of-sale (e.g. placard 1100 with merchant graphic 1105, FIG. 11).

In some embodiments, the wallet host system 112 may allow the merchant to set up a merchant "pay account" to connect the merchant's wallet app 104A wallets (and/or card wallets) to her merchant pay account, enable and record transactions with customers, vendors, etc., conduct other financial transactions, provide general accounting and recordkeeping services, generate reports, calculate conversion of fiat currency to virtual assets, purchase prices, and the like, offer promotions, create merchant graphics and point-of-sale displays, or a combination thereof.

In various embodiments, the private key of the payor and public key of recipient can be used to facilitate change the ownership of (aka transfer) virtual assets (e.g. on a blockchain) at a point-of-sale associated with the merchant system 802. The merchant's wallet application 804 may be configured to handle the merchant's virtual asset wallets associated with the wallet application 804. Similarly, the merchant system 802 may include a key store by which the merchant's wallet can be accessed via the wallet application 804.

Turning to FIG. 9, a flowchart 900 is presented of a technique for registering a wallet application 104 for use with a merchant system 802. It should be understood that the particular flow of this flow diagram is used only to exemplify certain embodiments. In other embodiments, any of the various acts or components depicted in the flow diagram 900 may be omitted, or the acts or components may be performed in a different order, or even concurrently. In addition, other embodiments may include additional acts or components not depicted as part of the flow diagram. Further, the various acts may be described as being performed by particular devices for purposes of explanation, but should not be considered limited to those devices.

The exemplary flowchart 900 begins at block 905, where a server or back-end host device receives registration information for a merchant. The registration information may include identifying information for the merchant, a link to the merchant's payment site, and the like. In some embodiments, the registration information can be provided from a merchant system 802. For example, the merchant may register with the back-end system from a merchant system 802.

The flowchart 900 continues at block 910 where the merchant system 802 or merchant wallet application 104 determines a virtual asset wallet associated with the merchant. According to one or more embodiments, the merchant wallet application 104 may read in a key pair for registering the virtual asset wallet. Additionally, or alternatively, the merchant wallet application 104 can provide functionality to generate a new public/private key pair the merchant can use to set up a virtual asset wallet. For example, the merchant system 802 can include or access a key generator to obtain a key pair to be used as an address on a blockchain for a particular virtual asset type.

The illustrated flowchart continues at block 915, where a readable optical code is generated that encodes a link to a merchant payment site. In some embodiments, the readable optical code may be, for example, a QR code, and may be used to link the merchant payment site to a wallet host system 112. At block 920, the exemplary merchant system 802 reads the optical code from the merchant's wallet app 104 to link the merchant payment site to the wallet app.

The exemplary flowchart 900 continues at block 925, where a scannable optical code is generated for a public key of the virtual asset wallet associated with the merchant. In some embodiments, the scannable optical code may be, for example, a QR code. The scannable optical code may encode the public key for the merchant's wallet such that a user scanning the optical code can access the public key for payment to the merchant. If desired, the scannable optical code may have additional information encoded therein, such as a currency or virtual asset identifier and the like. The scannable optical code may be in the form of a merchant graphic and generated by the exemplary wallet application 104, merchant system 802 and/or the wallet host system 112.

In some embodiments, the merchant graphic may be protected (e.g. double-encrypted), such as to prevent an unauthorized person or device (e.g. a customer having the balance-checking feature on his/her wallet app 104) from scanning it to learn the merchant's virtual asset balance on the blockchain or otherwise accessing the merchant's virtual asset wallet. For example, the host system 112 may take the public key of the merchant's wallet and, using SHA 256 encryption, hash it with a password to create the merchant graphic.

The exemplary flowchart 900 concludes at block 930 where the system provides the scannable optical code (e.g., in the form of a merchant graphic) for presentation at the point-of-sale by the merchant. As such, a customer can scan the merchant graphic at the point-of-sale to initiate a transaction involving one or more wallets of the customer (accessible via the customer's wallet app 104 and/or one or more virtual asset access cards) and the merchant's virtual asset wallet(s).

In some embodiments, the merchant graphic can be printed for presentation at the point-of-sale and/or displayed on a point-of-sale display device. Thus, the exemplary system allows easy change of ownership of virtual asset associated with wallets in the user's wallet app 104 or card(s) to the merchant. Further, in many embodiments, when the merchant can be paid directly from a customer's virtual asset access card (e.g. to the merchant's wallet represented by the merchant graphic) with a direct submission to the blockchain, the virtual assets never pass through the wallet address of the purchaser's wallet app 104 (or, in some cases, any third party transaction entity (e.g. Coinbase)), allowing decentralizing merchant payments, keeping transaction costs low, allowing the virtual asset access cards to behave in some ways similar legacy payment cards (e.g. credit or debit cards), have any other benefits or a combination thereof.

In some embodiments, a merchant graphic can be generated on-the-fly, for example to reflect an amount for a particular transaction. As an example, a user of the merchant system may "ring up" one or more products being purchased to determine a price. The merchant's wallet app 104 may be configured to determine a virtual asset value for the transaction (e.g. based on a given fiat or digital currency) and encode a transaction amount in the merchant graphic that is accessible to the purchaser at the point-of-sale.

In various embodiments, when a merchant or other person wishes to sell virtual asset access cards that have one or more wallets "loaded" with virtual assets, the merchant system, merchant payment website, wallet app or other software may have the capability to determine how much fiat currency to charge the customer. For example, with the exemplary wallet app 104, the merchant can scan the private key on the card to see the amount of virtual assets assigned to the card then multiply it by the relevant exchange rate and add any fees to calculate how much fiat currency to charge for the card.

FIG. 10 shows a flowchart of a technique for utilizing a virtual asset wallet at a merchant point-of-sale in accordance with one or more embodiments. It should be understood that the particular flow of this flow diagram is used only to exemplify certain embodiments. In other embodiments, any of the various acts or components depicted in this flow diagram may be omitted, or the acts or components may be performed in a different order, or even concurrently. In addition, other embodiments may include additional acts or components not depicted as part of the flow diagram. Further, the various acts may be described as being performed by particular devices for purposes of explanation, but should not be considered limited to those devices.

The exemplary flowchart begins at block 1005 where a virtual asset wallet of a user may receive a request to pay from a virtual asset access card (e.g. registered with the wallet application) via a user interface. For example, a purchaser may open their wallet app 104 on their client device and select, from a user interface, to pay using a virtual asset access card. At block 1010, the exemplary wallet application 104 reads the merchant's scannable optical code at the point-of-sale that has an encoded version of the merchant's public key, for example in the form of a merchant graphic. For example, a camera (or other technology) on the client device may capture image or other data from which the code can be read by the device. In some embodiments, the wallet app 104 includes functionality to initiate a transfer of virtual assets to the merchant based on the encoded public key.

The illustrated flowchart 1000 continues at block 1015, where the wallet application 104 reads an optical code for a private key of a wallet associated with the customer's virtual asset access card. For example, a camera on the client device may capture image data from which the code can be read by the device. Then, at block 1020, the exemplary wallet app receives a transaction amount via the user interface. As described above, in some embodiments, the amount may be encoded into the merchant graphic. Additionally, or alternatively, the purchase amount may be input by the customer or merchant. Then, at block 1025, the exemplary wallet app 104 may convert the fiat transaction amount to a virtual asset transaction amount for the type of virtual assets associated with the customer's and/or merchant's virtual asset wallet. Finally, the flowchart 1000 concludes at block 1030 where the transaction is submitted to the corresponding blockchain.

Figure 12:
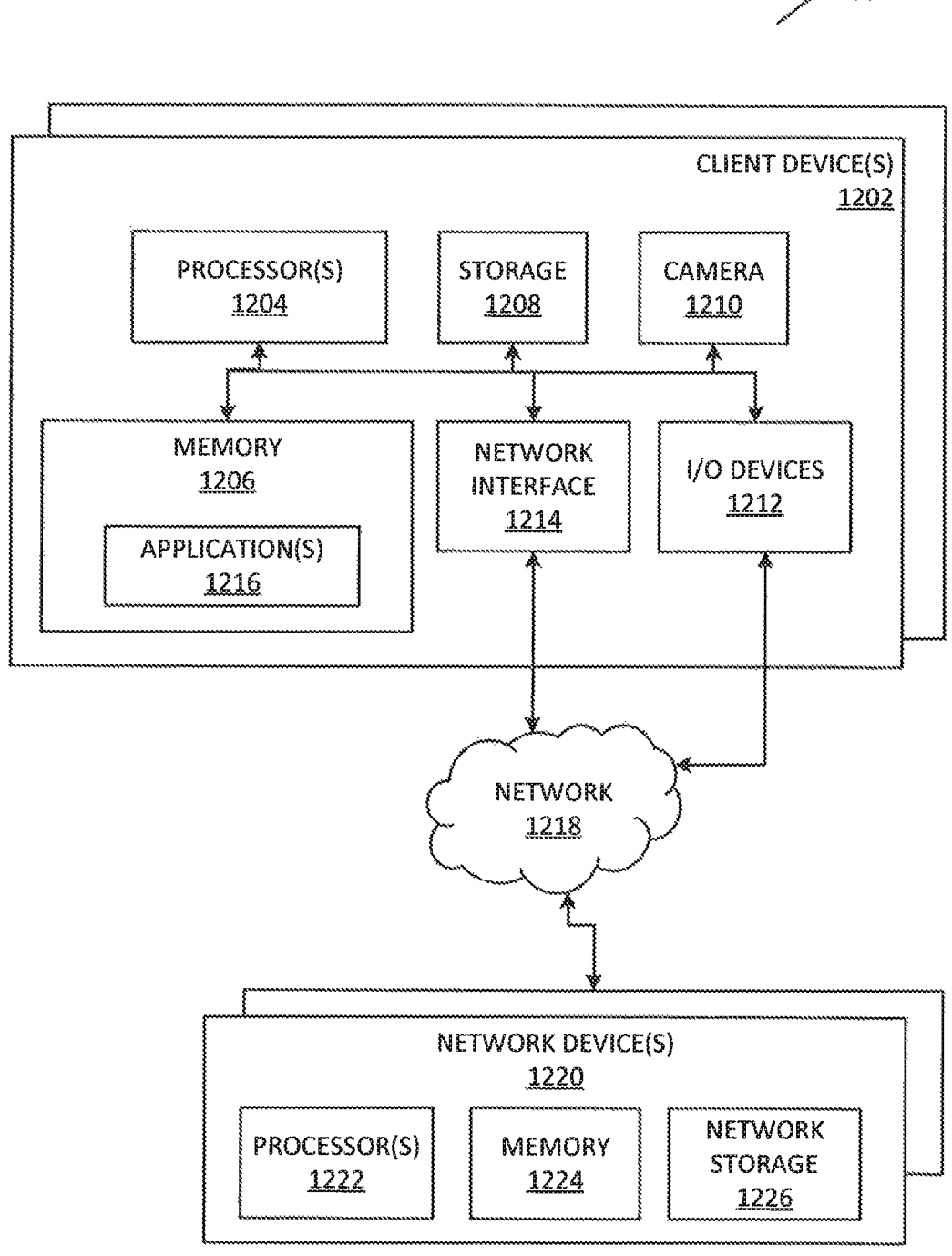
FIG. 12 shows an example network architecture in which various embodiments of the present disclosure may be implemented.

FIG. 12 shows an example of a network architecture in which various embodiments of the present disclosure may be implemented. The illustrated network diagram 1200 includes one or more client computing devices 1202 communicably connected to one or more network devices 1220 over a network 1218. Each exemplary client device 1202 may comprise a personal computer, tablet device, smart phone, network device, or any other electronic device which may be used to execute a virtual asset wallet application 104, such as a user device 102 or a merchant system 802. The network 1218 may comprise one or more wired or wireless networks, wide area networks, local area networks, short range networks, and the like. Users of the exemplary client device(s) 1202 can interact with the network device(s) 1220 to access services controlled and/or provided by the network device(s) 1220.

The client device(s) 1202 may include one or more processors 1204 of the same or different types, and may be configured to execute computer code or computer instructions. Client device(s) 1202 may also include one or more memory devices, such as memory 1206. The memory 1206 may include one or more different types of memory, which may be used for performing functions in conjunction with the processor(s) 1104. For example, the memory 1106 may include cache, ROM, RAM, or any kind of transitory or non-transitory computer readable storage media capable of storing computer readable code. The memory 1206 may store various programming modules and applications 1208 for execution by the processor(s) 1204.

The client device 1202 may also include a local storage 1208 which may store data utilized by the application(s) 1216. The application(s) 1216 may include, for example, a digital asset wallet application, and/or other applications which may be used in various embodiments described herein. Storage may include non-transitory computer readable media. The client device(s) 1202 may also include one or more cameras 1210, which may be used to capture image data that may be used by the application(s) 1216. The camera(s) 1210 may include, for example, RGB cameras, depth cameras or the like, or a combination thereof.

In various embodiments, the client device(s) 1202 may also each include a network interface 1212 and I/O devices 1214. The network interface 1212 may be configured to allow data to be exchanged between client device(s) 1202 and/or other devices communicably coupled across the network 1218 and may support communication via wired or wireless data networks. One or more input/output devices 1214 may include one or more display devices, keyboards, keypads, touchpads, mice, scanning devices, voice or optical recognition devices, or any other devices suitable for entering or retrieving data by or with one or more client devices 1202.

The network device(s) 1220 may include similar components and functionality as those described in client device(s) 1202, one or more servers, network storage devices or additional client devices and the like, or a combination thereof. Specifically, the network device(s) 1220 may include memory 1224, storage 1226, and/or one or more processors 1222. While the various components are presented in a particular configuration across the various systems in the network diagram 1200, it should be understood that the various modules and components may be differently distributed across the network.

Figure 13:
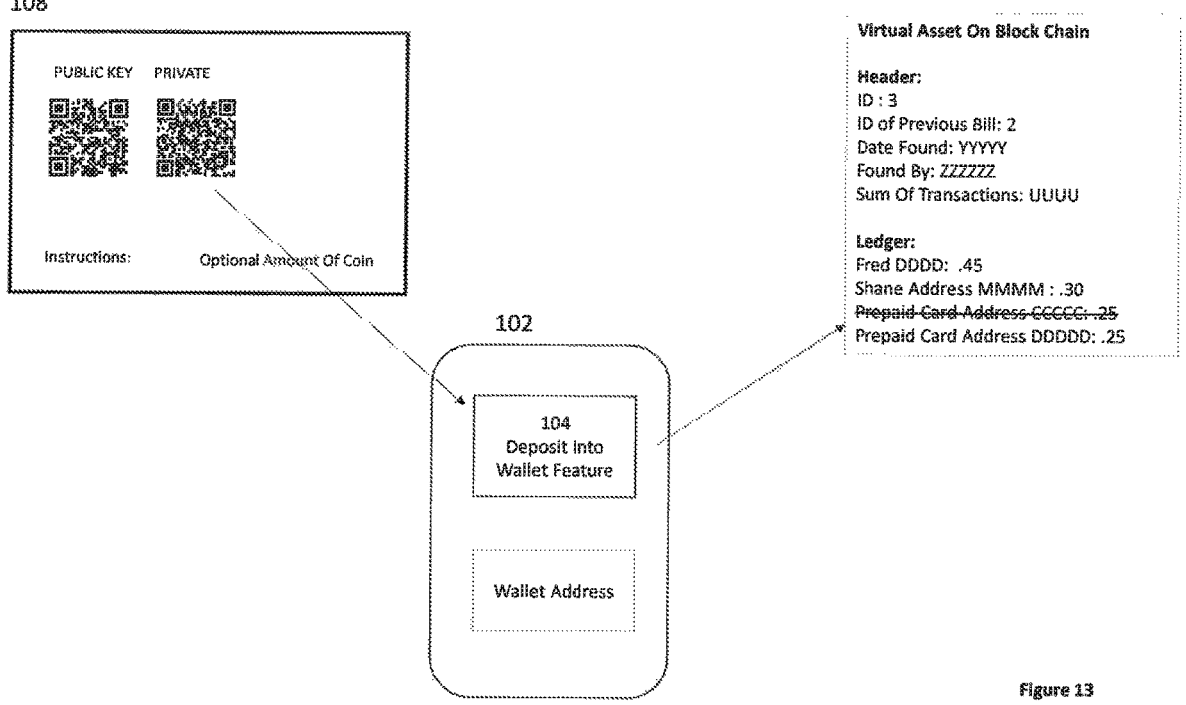
FIG. 13 is a block diagram illustrating an exemplary deposit into wallet feature in accordance with various embodiments of the present disclosure.

FIG. 13 illustrates an example wallet app 104 "deposit" capability to transfer virtual assets from a virtual asset access card 108 into a virtual asset wallet accessible from the wallet app 104 (e.g. on device 102). For example, using the wallet app 104 on a device (smart phone), the user can press a "deposit" button and scan the card's private key. The exemplary wallet app 104 will send a request to the relevant blockchain to change the ownership of the virtual assets on the blockchain associated with the card wallet to the wallet address of a wallet in the wallet app 104. If accepted, the blockchain will be modified so that the virtual assets are no longer assigned to the card. This is sometimes referred to as the "deposit into wallet" feature.

Figure 14:
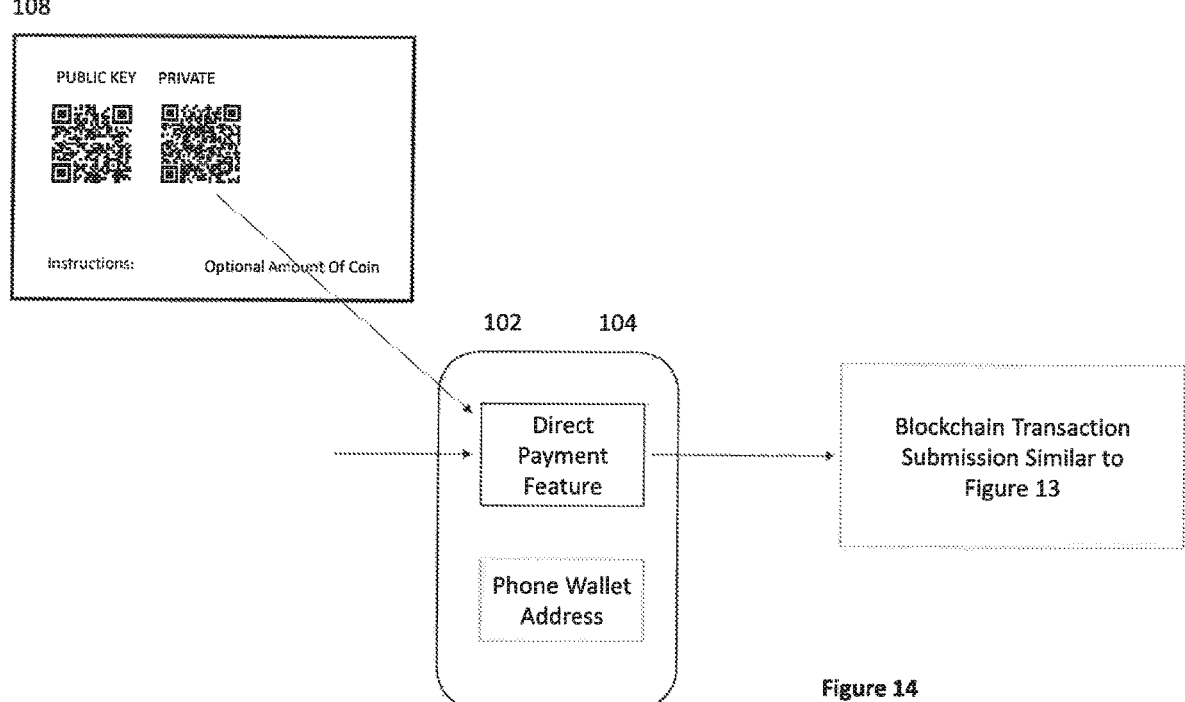
FIG. 14 is a block diagram illustrating an exemplary wallet cloning feature in accordance with various embodiments of the present disclosure.

FIG. 14 illustrates an example wallet app 104 cloning capability. In this example, a new wallet is created in the wallet app 104 to have the same private and public keys, and thus the same wallet address, as the card 108. This exemplary "direct pay" feature does not use the public or private keys from the wallet app 104A so typically no third party transaction fees are incurred.

Figure 15:
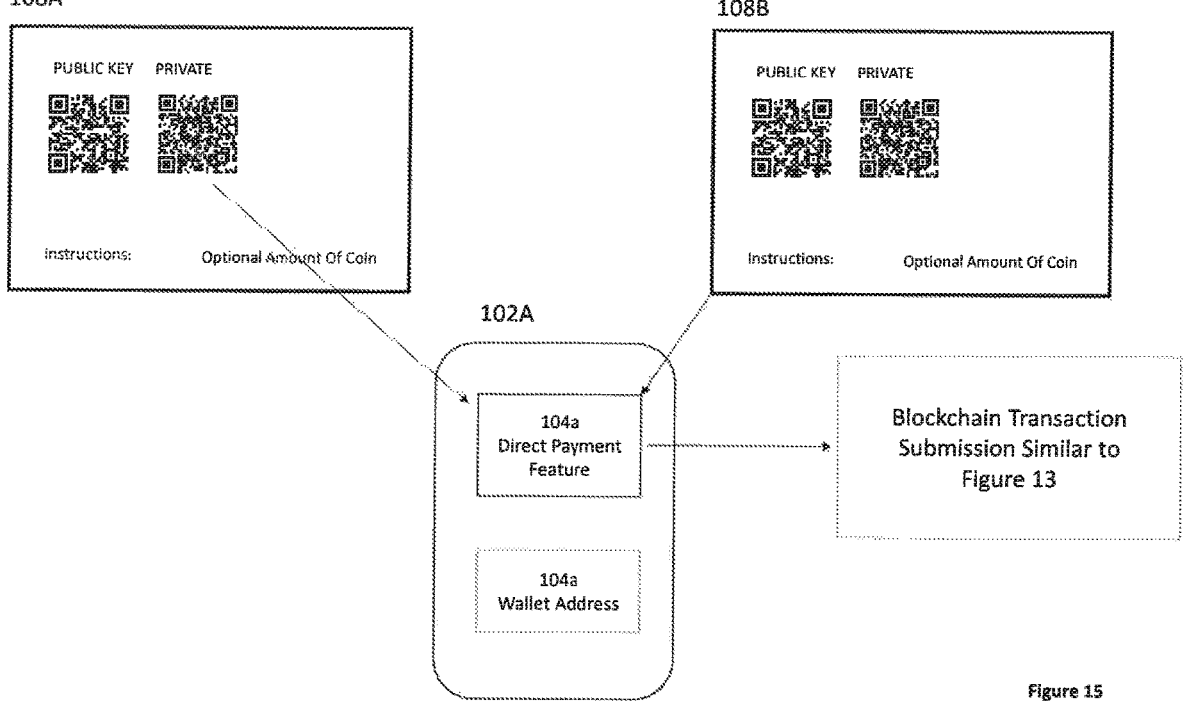
FIG. 15 is a block diagram illustrating an exemplary combining wallet balances features in accordance with various embodiments of the present disclosure.

If desired, the wallet app 104 (or other component of the above systems) may be used to move virtual assets between wallets (combine balances), in some cases incurring only one third party transaction fee per transfer. For example, referring to FIG. 15, the wallet app 104 may be used to combine the virtual assets associated with wallets on multiple virtual asset access cards 108A, 108B into one wallet without going through any wallets in the wallet app 104. In the present embodiment, the wallet app 104 can be used to scan (or access) the private key information for the wallet on any card from which the holder wants to remove virtual assets and the public key for the wallet that will receive the virtual assets, and submit a change of ownership request to the relevant blockchain. Thus, the virtual assets from multiple exemplary cards can be combined. In the present embodiment, the wallet app 104 can similarly be used to move virtual assets associated with wallets residing on any among one or more cards, the user's wallet app 104 and other wallet apps 104 or devices.

Another feature of the wallet app 104 of various embodiments allows moving a wallet from yet another location into the wallet app 104, such as by entering secure words associated with that wallet being moved or scanning private key information.

Figure 16:
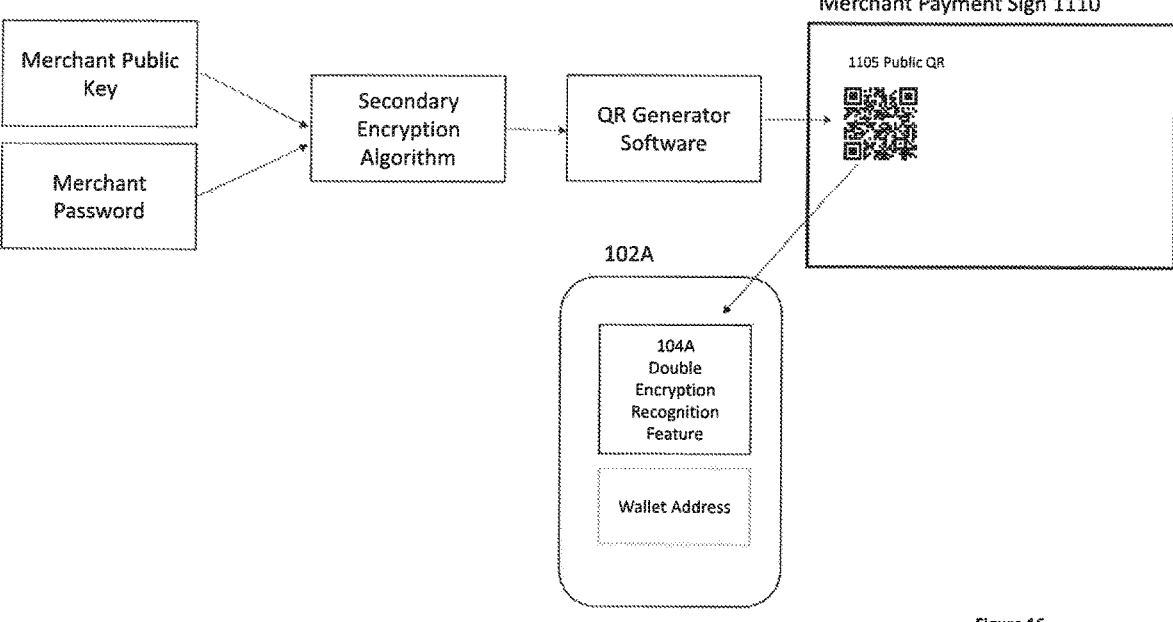
FIG. 16-18 are block diagrams illustrating an exemplary customer-merchant payment features in accordance with various embodiments of the present disclosure.

FIG. 16 illustrates an example creation and use of a double-encrypted public key (e.g. QR code) 1105 for merchants. In the customer's wallet app 104A, a special merchant payment QR code recognition feature allows payment to the merchant without the customer being able to access any confidential information or virtual assets associated with the merchant's wallets.

Figures 13, 17:
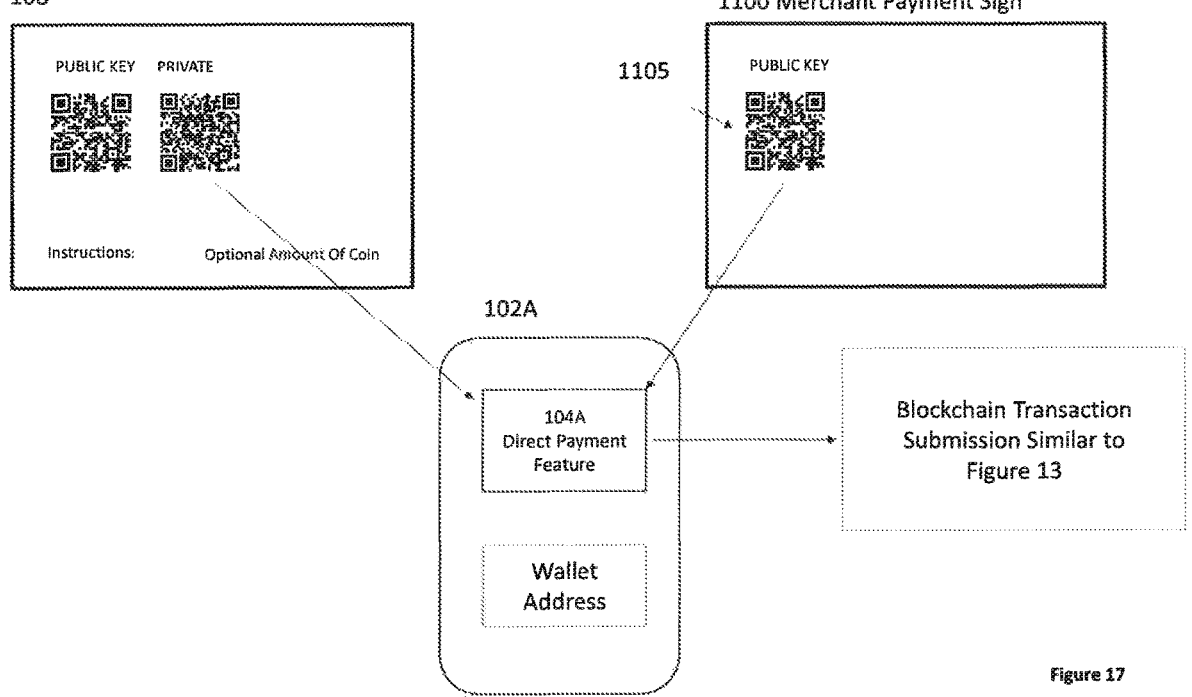

Referring to FIG. 17, for example, the customer can use his wallet app 104A to scan a private key on her card 108 and scan the merchant's graphic 1105 (e.g. on a merchant sign 1100, card, smart phone, other device, etc.) to instruct the blockchain to change ownership of virtual assets associated with a wallet of the card 108A. This exemplary "direct pay" feature does not use the public or private keys from the wallet app 104A, but uses one or more keys from the card 108A to pay the merchant, typically incurring only one transaction fee.

Figure 18:
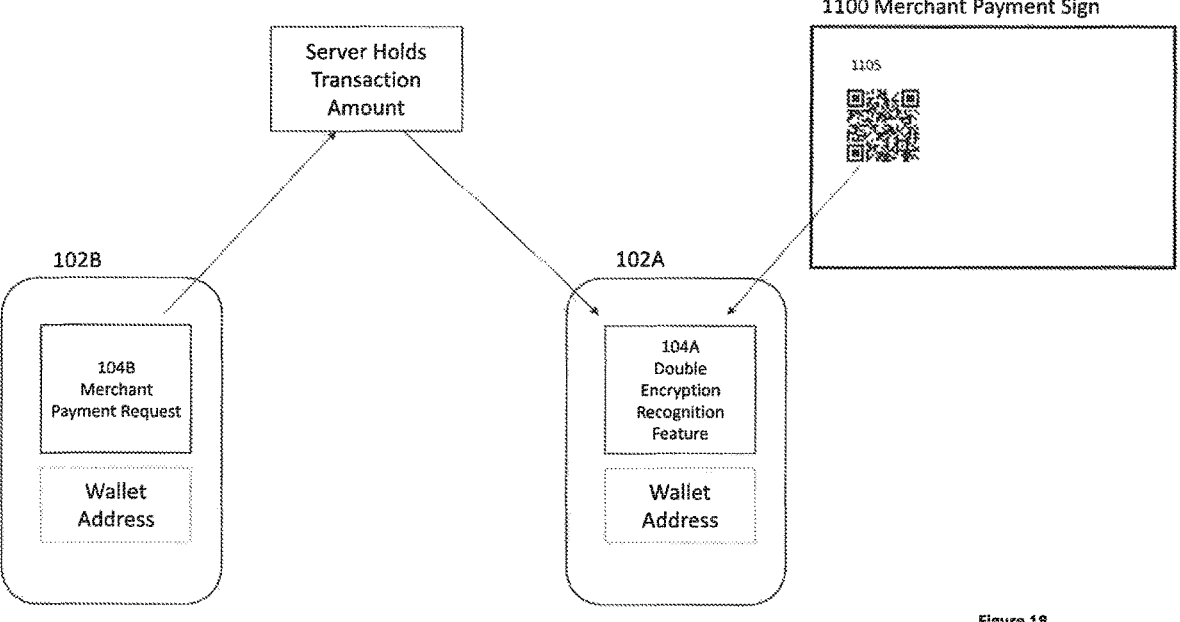

In FIG. 18, an exemplary "merchant request" feature allows a merchant to place a payment request in a que with her public double encrypted QR, allowing the customer to scan the merchant payment graphic 1105 sign and approve the transaction. In this embodiment, the merchant's wallet app 104B has a merchant request feature allowing a merchant to place a payment request in que with her public double encrypted QR. The customer wallet app 104A has a payment feature to check the merchant system (e.g. server) for any queued transactions, allowing customer to scan the merchant graphic 1105 to approve the transaction.

It should be noted that all processes in this patent involving accessing and utilizing a private key are similarly applicable with respect to a public key (though it may be for a different purpose), to the extent not in conflict with any other details, features or capabilities explicitly provided herein or as may be apparent from this specification and the appended drawings, and vice versa. Similarly, all processes in this patent involving accessing and utilizing a virtual asset access card are similarly applicable with respect to a user's or another person's wallet app or device, to the extent not in conflict with any other details, features or capabilities explicitly provided herein or as may be apparent from this specification and the appended drawings, and vice versa.

It should further be noted that discussions and illustrations herein involving the type, location, identification, storage and transaction of virtual assets (e.g. the nature of a private key, public key, blockchain transaction and the like) are for illustrative purposes. Such details are likely to change as the virtual asset environment evolves and matures and have no bearing upon the inventive apparatus, systems and methods of the present disclosure, which are intended to accommodate, and apply regardless of, those changes. Thus, the present disclosure is not limited to, or by, the nature or particular features, and techniques relating to the location, identification, storage and transaction of virtual assets, except and only to the extent as may be expressly specified otherwise herein or in a particular claim hereof and only for such specific references, claim(s) and any claim(s) depending therefrom. For example, while the terms "public key" and "private key" are used in this patent to help describe the inventive systems, apparatus, articles of manufacture and methods herein (because they are currently used for identifying, locating and transacting certain types of virtual assets), those terms are intended to represent any information relating to, or needed, for identifying, locating and transacting virtual assets, and should thus not be limiting upon the present disclosure or appended claims, except and only to the extent as may be expressly specified otherwise herein or in a particular claim hereof and only for such specific references, claim(s) and any claim(s) depending therefrom.

The present disclosure includes downloadable and/or non-downloadable computer software for use as a virtual asset wallet, generating cryptographic keys for receiving and spending virtual assets, requesting and recording financial transactions, displaying, storing and transmitting information relating to virtual assets, storing virtual asset ownership and identification information, initiating, permitting, requesting and recording virtual assets transactions, providing an interface between an internet browser and distributed computing platforms, accessing distributed computing platforms, providing a user interface for authorizing, initiating and requesting blockchain transactions, managing digital identities, verifying digital identities and associated data transactions, providing encryption, initiation of secure data transactions, capturing, verifying and/or authenticating biometric and optical data and storing biometric and optical data, or a combination thereof.

The present disclosure also incorporates data processing in the field of virtual asset ownership and transactions, transaction authorization and settlement services, electronic payment processing services, dissemination of financial information via a global computer network, pre-paid card services offered through cards with stored value or virtual asset related information, electronic payment initiation and processing services, authentication and verification services, facilitating person-to-person payment services through electronic means via a global computer network, or a combination thereof.

The present disclosure also includes requesting and initiating electronic virtual asset transactions over public computer networks to facilitate electronic commerce, providing financial information in the field of virtual assets, providing a decentralized virtual asset transaction platform for use by members of an on-line community via a global computer network, providing the initiation of electronic transfer of virtual assets for use by members of an on-line community via a global computer network, electronic transmission of information, providing a website featuring technology that enables users to create virtual asset wallets, initiate the purchase and transfer of virtual assets, and generates printable virtual asset access cards and point-of-transaction displays, placards and signs, encoding information relating to virtual assets on virtual asset access cards and point-of-transaction displays, placards and signs, or a combination thereof.

Preferred embodiments of the present disclosure thus offer advantages over the prior art and are well adapted to carry out one or more of the objects of this disclosure. However, the present invention does not require each of the components and acts described above and is in no way limited to the above-described embodiments and methods of operation. Any one or more of the above components, features, aspects, capabilities and processes may be employed in any suitable configuration without inclusion of other such components, capabilities, aspects, features and processes. Thus, embodiments of the present disclosure may have any one or more of the features described or shown in this patent. Moreover, the present invention includes additional features, capabilities, functions, methods, uses and applications that have not been specifically addressed herein but are, or will become, apparent from the description herein, the appended drawings and claims.

The methods that may be described above, claimed herein or are apparent from this patent and any other methods which may fall within the scope thereof can be performed in any desired or suitable order and are not necessarily limited to any sequence described herein or as may be listed in any appended claims. Further, the methods of various embodiments of the present disclosure may include additional acts beyond those mentioned herein and do not necessarily require use of the particular embodiments shown and described herein, but are equally applicable with any other suitable structure, form and configuration of components.

While exemplary embodiments have been shown and described, many variations, modifications and/or changes of the system, apparatus and methods of the present disclosure, such as in the features, components, details of construction and operation, arrangement of acts and parts and the manufacture, assembly or use, are possible, contemplated by the patent applicant hereof, within the scope of any appended claims, and may be made and used by one of ordinary skill in the art without departing from the spirit, teachings and scope of this disclosure and any appended claims. Thus, all matter herein set forth or shown in the accompanying drawings should be interpreted as illustrative, and the scope of the disclosure and any appended claims should not be limited to the embodiments described or shown herein.

The invention claimed is:

1. A virtual asset access card comprising:
a main body portion including at least a first item of information associated with a public key that corresponds with a virtual asset wallet;
a detachable portion including at least a second item of information associated with a private key that corresponds with the public key, the detachable portion being releasably coupled to the main body portion; and
at least one unique connector associated with the main body portion and the detachable portion, the at least one unique connector being specific to the main body portion and the detachable portion and configured to allow the detachable portion to be separated from and thereafter re-coupled to the main body portion while not being connectable to any portions of any other virtual asset access cards.

2. The virtual asset access card of claim 1, wherein the second item of information is at least temporarily concealed.

3. The virtual asset access card of claim 1, wherein the virtual asset access card presents the first and second items of information using at least one selected from a group consisting of RFID technology, smart label technology, magnetic stripe technology and QR code technology.

4. The virtual asset access card of claim 1, wherein the at least one unique connector includes a unique arrangement of at least two mating features, at least a first mating feature being associated with the main body portion and at least a second mating feature being associated with the detachable portion.

5. The virtual asset access card of claim 1, wherein the at least one unique connector includes at least a first unique non-linear mating edge associated with the main body portion and at least a corresponding second unique non-linear mating edge associated with the detachable portion, the first and second mating edges being mateable with one another to interconnect the main body portion and the detachable portions and not mateable with any portions of any other virtual asset access cards.

6. The virtual asset access card of claim 1, wherein the at least one unique connector includes a unique arrangement of one or more pins and corresponding receivers.

7. The virtual asset access card of claim 5, wherein the main body portion and the detachable portion are interconnectable and separable along at least one scam and the at least one unique connector includes at least one visible image extending across the seam.

8. The virtual asset access card of claim 7, wherein the at least one visible image includes at least one selected from a group consisting of at least one watermark, graphic, code and imprint.

9. A virtual asset access card comprising:
a first portion providing access to a public key that corresponds with a virtual asset wallet, the public key configured to allow access to information about the virtual asset wallet and assist in associating virtual assets with the virtual asset wallet; and
a second portion providing access to a private key that corresponds with the public key, the private key being configured to allow the ownership of virtual assets associated with the virtual asset wallet to be changed, wherein the first and second portions are selectively releasably interconnectable only with one another and configured to be repeatedly selectively physically separated from one another and thereafter reconnected together while not being connectable to any portions of any other virtual asset access cards.

10. The virtual asset access card of claim 9, wherein the first and second portions are slidably engageable.

11. The virtual asset access card of claim 9, wherein the second portion is insertable into and removable from the first portion, whereby when the second portion is inserted into the first portion, the private key is inaccessible.

12. The virtual asset access card of claim 9, further including at least a first mating feature associated with the first portion and at least a second mating feature associated with the second portion, the first and second mating features being mateable with one another to interconnect the first and second portions and not mateable with any portions of any other virtual asset access cards.

13. The virtual asset access card of claim 9, further including at least one connector associated with the first and second portions and configured to allow the first and second portions to be disconnected from one another and thereafter reconnected together while not being connectable to any portions of any other virtual asset access cards.

14. The virtual asset access card of claim 9, wherein the virtual asset access card is configured to fit within at least one selected from a group consisting of a wallet and a clothing pocket.

15. A contactless virtual asset access card comprising:
a first portion including a first machine-readable code associated with a public key that corresponds with a first virtual asset wallet, the first machine-readable code being visible and configured to be electronically scanned without physically contacting the virtual asset access card to allow access to information about the first virtual asset wallet and assist in associating virtual assets with the first virtual asset wallet;
a second portion including a second machine-readable code associated with a private key that corresponds with the public key, the second machine-readable code being selectively visible so that, when visible, the second machine-readable code is configured to be electronically scanned without physically contacting the virtual asset access card to allow the ownership of virtual assets associated with the first virtual asset wallet to be changed; and at least one reusable concealer associated with the second machine-readable code and configured to provide selective access to the second machine-readable code.

16. The contactless virtual asset access card of claim 15, further including a third machine-readable code configured to provide access to a wallet application host site.

17. The contactless virtual asset access card of claim 15, wherein the first and second machine-readable codes are configured to be read by one or more software applications provided in a non-transitory computer readable medium comprising computer readable code executable by one or more processors, the second machine-readable code being configured to be read by the one or more software applications to generate a duplicate version of the public and private keys without interacting with a blockchain, the duplicate version of the public and private keys being configured to be associated with a second virtual asset wallet and used to change the ownership of virtual assets associated with the first virtual asset wallet.

18. The contactless virtual asset access card of claim 15, wherein the reusable concealer is a holder which provides the first machine-readable code, further wherein the second machine-readable code is provided on an insert insertable into and removable from the holder, whereby when the insert is inserted into the holder, the second machine-readable code is inaccessible.

19. The contactless virtual asset access card of claim 15, wherein the reusable concealer is provided in a software application configured to allow access to the second machine-readable code upon the presentation of at least one selected from a group consisting of at least one password, bio-metric feature, access code and graphic.

20. The contactless virtual asset access card of claim 15, wherein the first and second machine-readable codes each include at least one selected from a group consisting of at least one QR code, bar code, magnetic stripe, smart label, data matrix, RFID tag and RFID label.

\* \* \* \* \*